United States Patent [19]

Shimizu

[11] 4,404,672

[45] Sep. 13, 1983

[54] SUBSCRIBER TERMINAL FOR USE IN A TIME SHARED BIDIRECTIONAL DIGITAL COMMUNICATION NETWORK

[75] Inventor: Hiroshi Shimizu, Tokyo, Japan

[73] Assignee: Nippon Electric Co., Ltd., Tokyo, Japan

[21] Appl. No.: 245,281

[22] Filed: Mar. 19, 1981

[30] Foreign Application Priority Data

Mar. 28, 1980 [JP] Japan .................................. 55-40901
May 8, 1980 [JP] Japan .................................. 55-60911
May 9, 1980 [JP] Japan .................................. 55-61431

[51] Int. Cl.³ ................................................ H04J 3/00
[52] U.S. Cl. ..................................... 370/29; 370/110.1
[58] Field of Search ......................... 370/29, 31, 32, 24, 370/105, 110, 111, 110.1; 371/62; 375/108

[56] References Cited

U.S. PATENT DOCUMENTS 4,049,908 9/1977 Knorpp et al. ..................... 370/29
4,287,589 9/1981 Nakamura et al. ................. 370/31

*Primary Examiner*—Gerald L. Brigance
*Attorney, Agent, or Firm*—Sughrue, Mion, Zinn, Macpeak and Seas

[57] ABSTRACT

In a digital subscriber set (31) in which a line receiver (36) receives, when enabled, digital signal bursts from a master terminal (32) and in which a line driver (37) sends, when enabled, digital signal bursts to the master terminal in synchronism with the signal bursts received from the master terminal, a circuit (67, 69, 71, 72) temporarily disables and enables the line receiver and the line driver to send a call orignating signal to the master terminal and then enables and disables the line receiver and the line driver continuously until synchronism is established by at least one digital signal burst which the master terminal supplies to the subscriber set in response to the call originating signal. The circuit recovers synchronism within the shortest possible time when synchronism is lost for any reason during communication.

17 Claims, 29 Drawing Figures

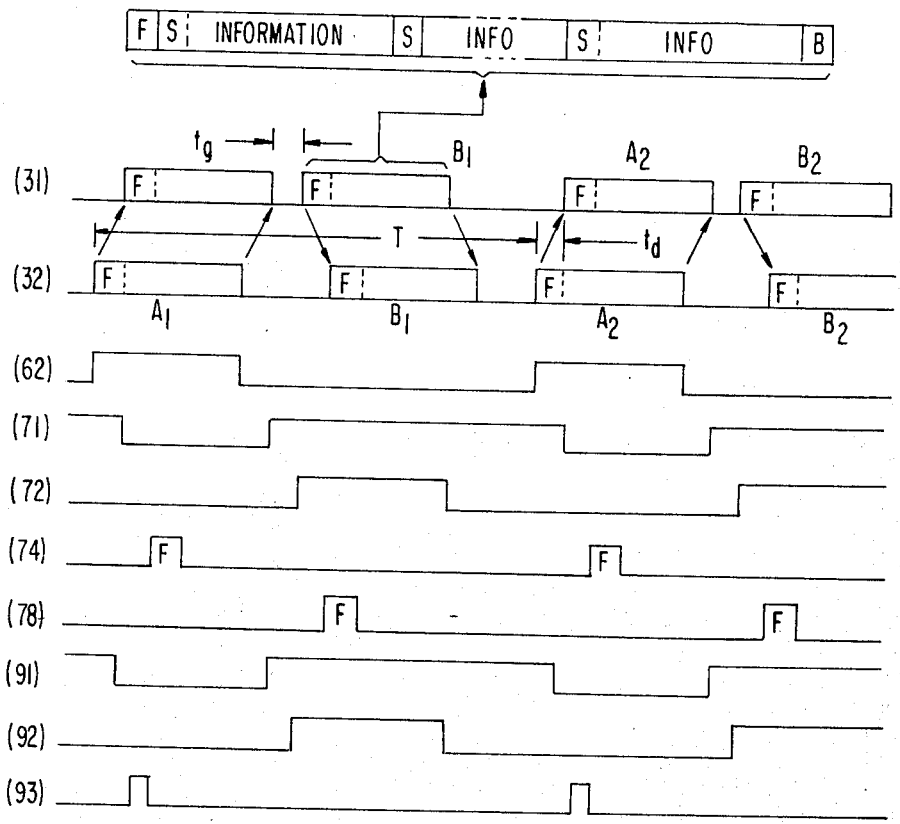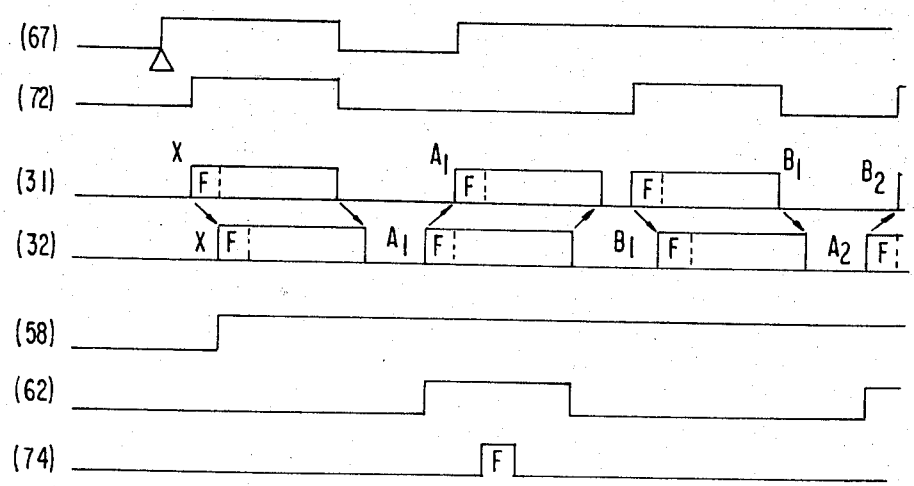

FIG. 3
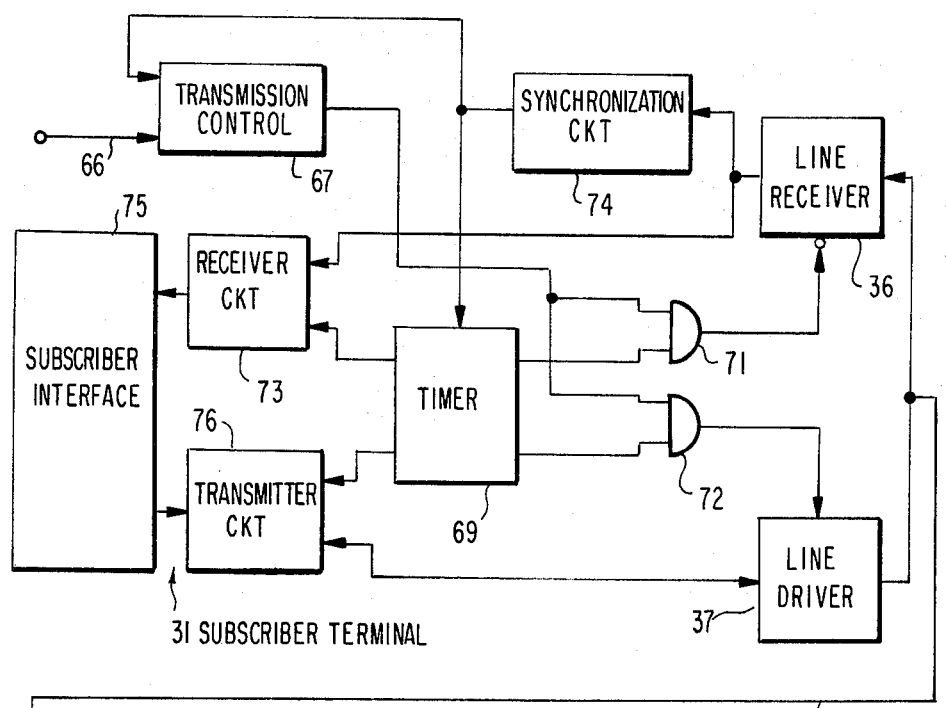
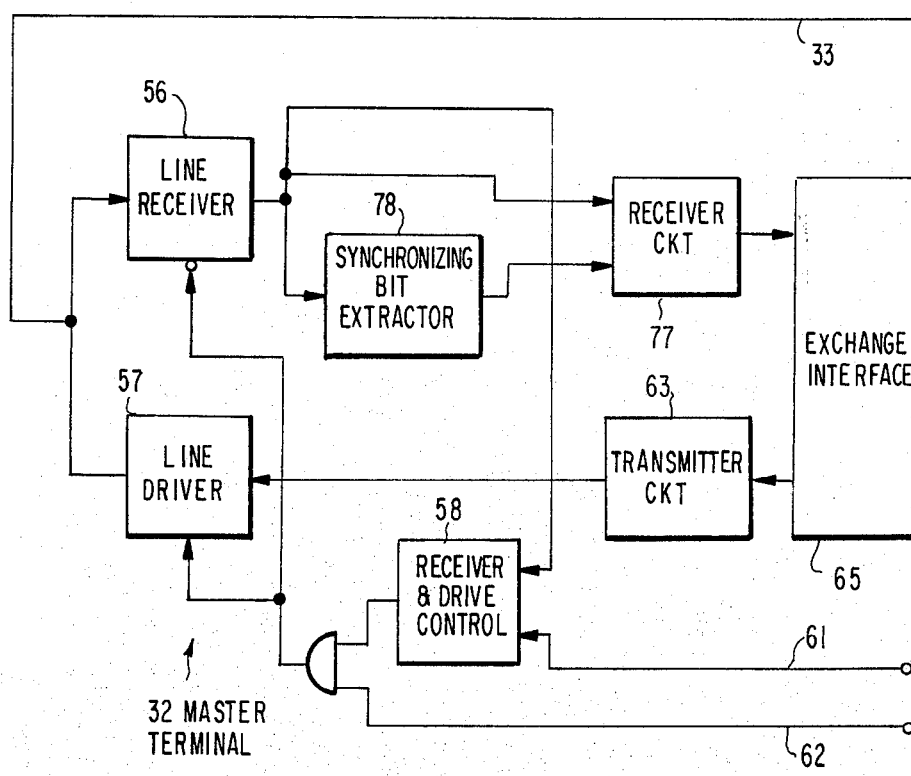

FIG. 18
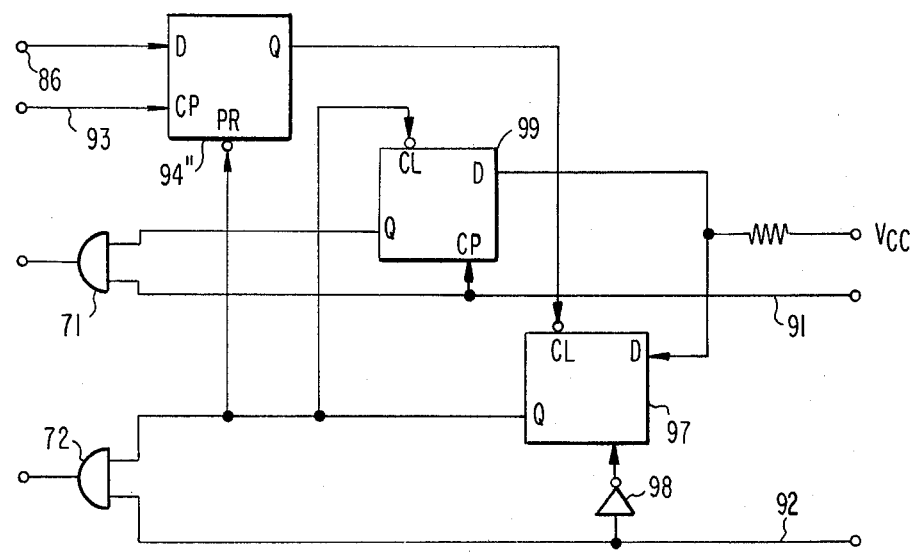
FIG. 19
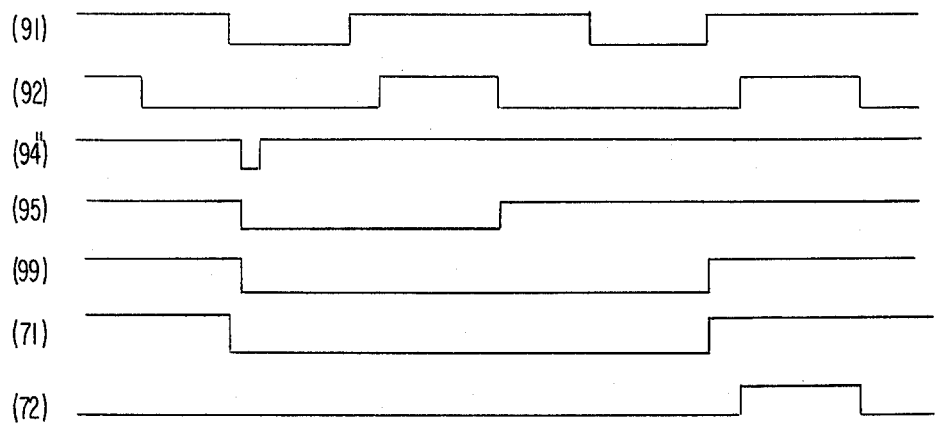
FIG. 20
| A | $S_1$ | $S_2$ | $S_3$ | $S_4$ | $S_5$ | $S_6$ | $S_7$ | $S_8$ |
|---|---|---|---|---|---|---|---|---|
| | 1 | 0 | 0 | 1 | | | | |
| B | F | S | INFORMATION |
|---|---|---|---|
| C | $S_3$ | $S_4$ | $S_5$ | $S_6$ | $S_7$ | $S_8$ | $S_1$ | $S_2$ |
|---|---|---|---|---|---|---|---|---|
| | 0 | 1 | | | | | 1 | 0 |
FIG. 21
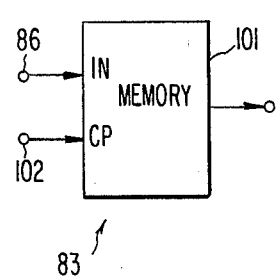

SUBSCRIBER TERMINAL FOR USE IN A TIME SHARED BIDIRECTIONAL DIGITAL COMMUNICATION NETWORK

BACKGROUND OF THE INVENTION

This invention relates mainly to a digital subscriber set, a subscriber terminal for use in a time shared bidirectional digital communication network, such as a time shared two-wire digital communication network.

As described in, for example, an article contributed by Jan Meyer, Terje Røste, and Roald Torbergsen to IEEE Transactions on Communications, Vol. COM-27, No. 7 (July 1979), pages 1096–1103, under the title of "A Digital Subscriber Set," with reference to FIGS. 2, 3, 8, and 14 thereof in particular, a time shared two-wire digital communication network comprises a plurality of master terminals, a plurality of subscriber terminals, and a plurality of conventional two-wire communication or subscriber lines between the master and the subscriber terminals. The master terminal may be a line circuit (subscriber circuit) of a digital telecommunication exchange or a like circuit.

As will become clear as the description proceeds, a subscriber terminal according to this invention is usable in a more general time shared bidirectional digital communication network. The subscriber terminal may be connected to a master terminal through a more general communication channel. Merely for brevity of description, the network and the master terminal will be restricted in the following to a time shared two-wire digital communication network and to a line circuit in a central office of the network. The communication channel will be called a communication line.

Speech and/or data information to be exchanged between a pair of subscriber terminals and consequently between each subscriber terminal and a counterpart master terminal, is bidirectionally transmitted as digital signal bursts through an interconnecting communication line. The data information may be given by facsimile signals. Inasmuch as this invention relates mainly to a subscriber terminal, the signal bursts received thereby from and sent therefrom to the communication line will be referred to as digital "receive" signal bursts and digital "send" signal bursts.

In order to separate the two transmission types on the communication line by time division, the receive and the send signal bursts are alternately received from the communication line and sent thereto by a subscriber terminal at a predetermined repetition frequency, herein called a frame frequency. In other words, the communication line transmits successive receive or send signal bursts, one in each frame period. Each signal burst consists of a predetermined number of consecutive signal bits of a bit rate defined by clocks. The information is encoded into the signal bits and decoded therefrom at the subscriber terminal. Such operation of the subscriber terminal must be timed by the frame periods and the clocks. In other words, the operation must be synchronized with phases of the frame periods and the clocks, herein termed a frame phase and a bit phase.

On initiating a call from a subscriber terminal, a call originating signal is sent to a master terminal as at least one send signal burst. It has been the practice that the central office always delivers receive signal bursts to all subscriber terminals in the network in order to synchronize the call originating signal with the frame and the bit phases. This is objectionable in view of the power consumption at the central office, which usually remotely feeds the subscriber terminals in the network.

An improved subscriber terminal has therefore been proposed to reduce the power consumption. However, the improved subscriber terminal is bulky and heavy and must comprise a hook switch pair as will later be described with reference to one of of the accompanying drawing.

However much the subscriber terminal might be improved, the receive and the send signal bursts will still be out of frame and/or clock synchronism at the beginning of call origination. Even during communication, the signal bursts may go out of synchronism. For the best possible performance of a time shared two-wire digital communication network, such loss of synchronism must be corrected within the shortest possible interval of time.

Hook switch pairs have been used since very early stages of development of telephones (and are still called by the name of "hook" even in a telephone set where an actual hook is no longer used). Although the hook switch pair is highly reliable, it often causes trouble in the telephone network. The trouble occurs when a handset of the subscriber terminal is misplaced on the "hook." In a telephone set in which a microphone and a loudspeaker are substituted for a conventional handset, the hook switch pair is no longer indispensable.

SUMMARY OF THE INVENTION

It is therefore a general object of the present invention to provide a subscriber terminal for use in a time shared bidirectional digital communication network, by which the power consumption at a central office of the network is reduced without rendering the subscriber terminal bulky and heavy.

It is another general object of this invention to provide a subscriber terminal of the type described, which improves the performance of the network.

It is a subordinate object of this invention to provide a subscriber terminal of the type described, which is capable of establishing frame synchronism in the shortest possible interval of time.

It is another subordinate object of this invention to provide a subscriber terminal of the type described, which comprises a clock generator capable of generating local clocks for use in the subscriber terminal with a correct bit rate and yet which has a simple structure.

It is still another subordinate object of this invention to provide a subscriber terminal of the type described, which need not necessarily comprise a hook switch pair.

A subscriber terminal to which this invention is applicable is intended for use in a bidirectional communication network in which the subscriber terminal is connected to a master terminal through a communication channel and in which the subscriber terminal receives a digital receive signal burst from the master terminal through the channel and sends a digital send signal burst to the master terminal through the channel on a time shared basis in each frame period to carry out communication with the master terminal in a communication interval following a call originating interval. The subscriber terminal comprises first means capable of being put once in each frame period in a first mode of producing digital receive signals with a first frame phase in response to the receive signal bursts received through the channel, second means capable of being put once in each frame period in a second mode of supplying digital send signals with a second frame phase to the channel as the send signal bursts, third means responsive to the receive signals for putting the first and the second means in the first mode and out of the second mode, respectively, and then out of the first mode and in the second mode, respectively, in each frame period to synchronize the second frame phase with the first frame phase, means responsive to the receive and the send signals for carrying out the communication, and means for producing a call originating signal in the call originating interval.

According to this invention, the above-specified subscriber terminal comprises means responsive to the call originating signal for activating the third means to make the third means put the first means and the second means temporarily out of the first mode and in the second mode, respectively, and then in the first mode and out of the second mode, respectively, continuously until the call originating interval is followed by the communication interval. The second means supplies the call originating signal to the channel while being temporarily put in the second mode. The first means produces, while being continuously put in the first mode after being temporarily put out of the first mode, a digital receive signal with the first frame phase in response to each digital receive signal burst supplied to the channel by the master terminal in response to the call originating signal arriving thereat through the channel.

BRIEF DESCRIPTION OF THE DRAWING

FIG. 2 schematically shows a few signals used in the subscriber and the master terminals depicted in FIG. 1, together with several signals for use in describing operation of a subscriber terminal according to the preferred embodiments of the instant invention;

FIG. 3 shows in blocks a subscriber terminal according to a first embodiment of this invention together with a master terminal;

FIG. 4, drawn below FIG. 2, shows several signals for use in describing operation of the subscriber and the master terminals illustrated in FIG. 3;

FIG. 5, shows several signals for use in describing operation of the subscriber terminal shown in FIG. 5;

FIG. 18 is a block diagram of a part of a subscriber terminal according to a modification of the subscriber terminal shown in any one of FIGS. 5, 11, and 14;

FIG. 19 shows several signals for use in describing operation of the subscriber terminal partially illustrated in FIG. 18;

FIG. 20 shows a few formats of a digital signal burst for use in a time shared bidirectional digital communication network which comprises a subscriber terminal of the type illustrated in any one of FIGS. 3, 5, 11, and 14;

FIG. 21 shows a frame synchronism monitor for use in the subscriber terminal illustrated in any one of FIGS. 3, 5, 11, and 14 when a modified format depicted in FIG. 20 is used;

FIGS. 8 and 15, is a block diagram of a clock regenerator for use in the subscriber terminal shown in any one of FIGS. 3, 5, 11, and 14;

DESCRIPTION OF THE PREFERRED EMBODIMENTS

Figure 1:
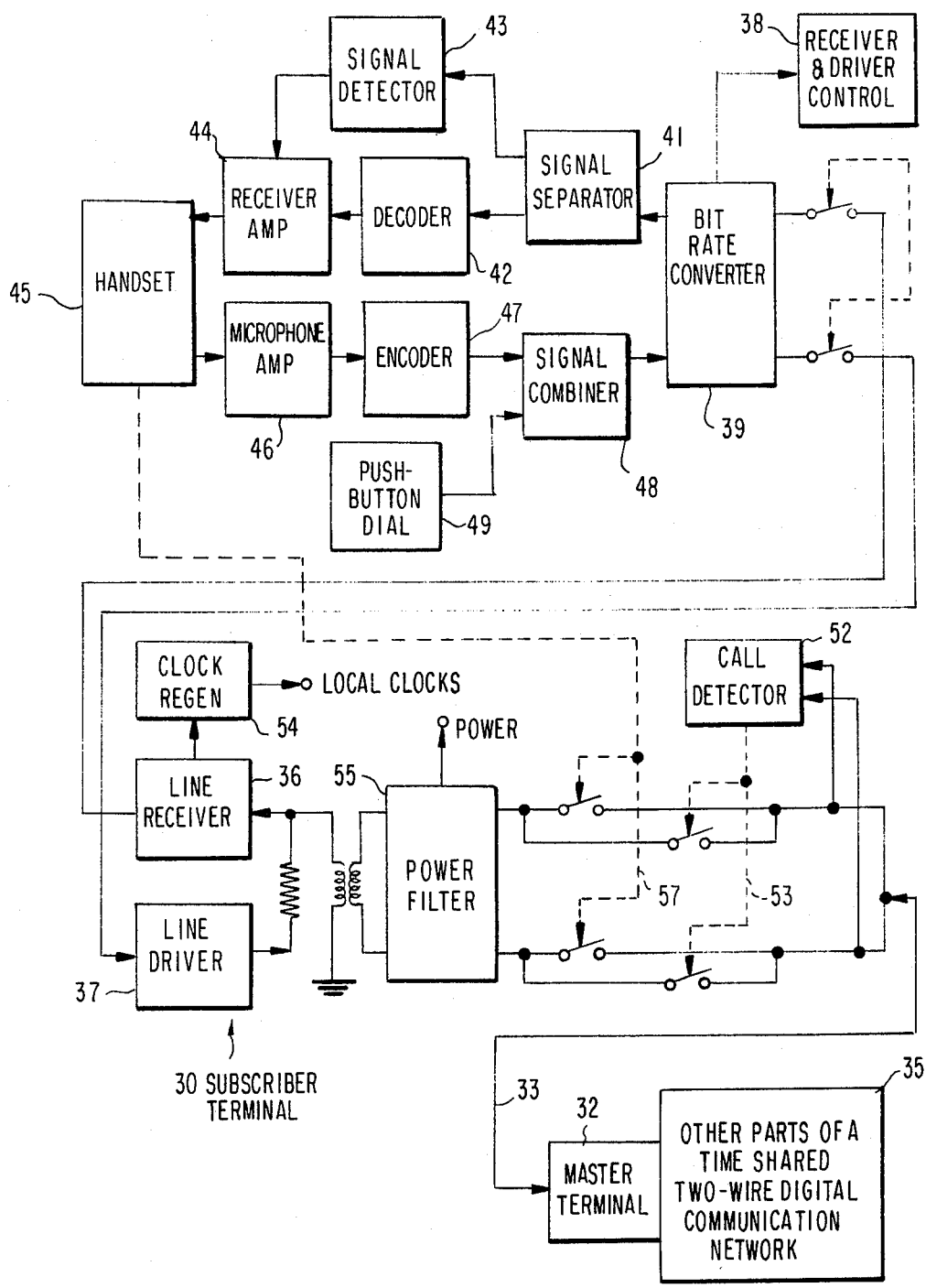
FIG. 1 is a block diagram of a conventional subscriber terminal and a master terminal used in a time shared two-wire digital communication network.

Referring to FIG. 1 and a portion of FIG. 2, a conventional subscriber terminal 30 will be described at first in order to facilitate an understanding of the present invention. Inasmuch as the subscriber terminal 30 is not much different in operation from subscriber terminals 31 (FIGS. 3 et seq.) according to the preferred embodiments of this invention, the reference numeral "31" will be used instead of "30" where the description is applicable also to the subscriber terminal according to this invention.

As described hereinabove, a time shared bidirectional digital communication network in which the subscriber terminal 31 is used, will be presumed to be a time shared two-wire digital communication network. In the network, the subscriber terminal 31 is connected to a master terminal 32 through a conventional two-wire communication line or loop 33. Again, the master terminal 32 will be assumed to be a line circuit of a digital telecommunication exchange. A block 35 shows other parts of the network and comprises the exchange, other master terminals, other subscriber terminals, and other communication lines. The exchange comprises links, trunk circuits, a central controller, and the like. The communication line 33 is capable of transmitting digital signals of up to, for example, 256 kHz. A predetermined bit rate, such as 144 kHz, is selected for the digital signals to be transmitted at least between a set of a subscriber terminal 31 and a master terminal 32 through a communication line 33.

In order to make it possible to bidirectionally exchange information during a communication interval of time, each of the subscriber and the master terminals 31 and 32 sends and receives the digital signals as digital signal bursts to and from the communication line 33. Each digital signal burst consists of a predetermined number of digital signal bits, such as one hundred and thirty bits, and has an accordingly predetermined burst length, such as about one millisecond.

Inasmuch as this invention relates mainly to a subscriber terminal 31, the signal bursts sent by the terminal to the communication line 33 and received therefrom will be called digital "send" signal bursts, respectively, and digital "receive" signal bursts, as mentioned heretobefore. As depicted in FIG. 2 at (31), a pair of send and receive signal bursts is transmitted through the communication line 33 within a predetermined frame period T, which should be longer than twice the burst length and may be, for instance, two milliseconds long. Digital signal bursts $A_1, A_2, \ldots$, supplied by the master terminal 32 to the communication line 33 as shown at (32) are received by the subscriber terminal 31 as receive signal bursts $A_1, A_2, \ldots$ with a transmission or loop delay $t_d$, which is about five microseconds per kilometer of the communication line 33. Send signal bursts $B_1, B_2, \ldots$ reach the master terminal 32 also with the transmission delay. A guard or idle time $t_g$ is provided between each receive signal burst and the next following send signal burst. The guard time may be about seventy microseconds long.

In order that the receive and the send signal bursts may be arranged time sequentially in the manner described above, frame or burst synchronism must be maintained therebetween. For this purpose, each of the receive and the send signal burst has a predetermined format, according to which a burst or frame synchronizing bit F is followed by information bits. At least one signalling bit S may be interspersed among the information bits. The information bits are representative of speech and/or data information. The signalling bits are for dial tone, ring tone, busy tone, calling tone, howler, and the like and are used in specifying the operation of the counterpart terminal 31 or 32. A d.c. balancing bit B is preferably added to each signal burst as the last digital signal bit. The d.c. balancing bit will be described later in greater detail. Other exemplary formats will also be discussed later.

The subscriber terminal 31 comprises a line receiver 36 connected to the communication line 33 and capable of being put once in each frame period in a first mode of producing binary receive signals with a first frame phase in response to the respective receive signal bursts. A line driver 37, also connected to the communication line 33, is capable of being put once in each frame period in a second mode of supplying binary send signals to the communication line 33 with a second frame phase as the respective send signal bursts.

In the conventional subscriber terminal 30, the line receiver 36 and the line driver 37 are controlled by a receiver and driver controller 38 of a type to be described in detail in conjunction with the subscriber terminal 31 according to this invention. Controlled by control signals supplied from a bit rate converter 39, the controller 38 puts the line receiver 36 and the line driver 37 in the first mode and out of the second mode, respectively, and then out of the first mode and in the second mode, respectively, in each frame period, thereby to synchronize the second frame phase to the first frame phase so that the receive and the send signals may correctly correspond to the receive and the send signal bursts, respectively.

The bit rate converter 39 converts the bit rate of the receive signals to a lower bit rate of, for example, 64 kHz. After this conversion operation, the burst synchronizing bits are no longer needed for in the lower bit rate receive signals. A signal separator 41 separates the information bits and the signalling bits from the lower bit rate receive signals. A decoder 42 decodes the separated information bits. A signal detector 43 discriminates among the signalling bits. The decoded information is supplied to a receiver amplifier 44 for the receiver (not shown) of a handset 45. The ringer and the howler are supplied from the signal detector 43 via the receiver amplifier 44. Speech signals produced by the microphone (not shown) of the handset 45 are amplified by a microphone amplifier 46 and then encoded by an encoder 47 into encoded signals. The encoded signals are supplied to the bit rate converter 39 through a signal combiner 48 and thence to the line driver 37 as the binary send signals. Numeric signals, such as multifrequency signals produced from a pushbutton dial 49, are also supplied to the bit rate converter 39 through the signal combiner 48.

The communication interval is normally preceded by a call initiated either by the subscriber terminal 31 or the master terminal 32. A call originating signal is therefore supplied from one or the other of the subscriber and the master terminals 31 and 32 to the communication line 33. The interval during which the subscriber and the master terminals 31 and 32 respond to a call originating signal is herein called a call originating interval of time.

With the conventional subscriber terminal 30, it is unnecessary for the master terminal 32 to always supply receive signal bursts to the communication line 33 even before production of a call originating signal by the subscriber terminal 30. On initiating a call, a pair of hook switches 51 are turned on (off hook). The master terminal 32 detects the closure of the communication loop 33 and then starts the supply of the receive signal bursts to the communication line 33. When a call is initiated at the master terminal 32, the communication loop 33 is not then closed. The subscriber terminal 30 is therefore provided with a call detector 52 responsive to the arriving call for closing a pair of call tone drive switches 53 coupled to the communication line 33 in parallel to the hook switch pair 51. After closure of the call tone drive switches 53, the master terminal 32 starts supply of the receive signal bursts. The hook switches 51, call detector 52, and call tone drive switches 53 render the subscriber terminal 30 bulky and heavy. In addition, the master terminal 32 must be provided with some means for detecting closure of the communication loop 33.

Further, a clock regenerator 54 is supplied with the receive signals to recover clocks therefrom for use as local clocks in the subscriber terminal 30. The power used in the subscriber terminal 30 is obtained from the communication line 33 by a power filter 55. For correct decoding, the recovered clocks must have a clock or bit phase precisely synchronized with a bit phase of the receive signal bursts.

Referring now to FIG. 3 and also to a greater part of FIG. 2, a subscriber terminal 31 according to a first embodiment of this invention is connected in a time shared two-wire digital communication network to a master terminal 32 through a conventional two-wire communication line 33. Throughout the figures illustrative of binary signals in the accompanying drawings, a logic "1" and a logic "0" level will be depicted as high and low levels, respectively.

This invention is directed to the art of synchronization in a subscriber terminal 31, and not specifically to separation of the information bits and the signalling bits from the binary receive signals, decoding of the information bits, detection of the signalling bits, encoding of speech and/or data information into information bits, production of signalling bits, and composition of the information and the signalling bits into the binary send signals. Furthermore, such processes are readily carried out after establishement of the synchronism. Consequently, the processes will not be described in detail.

Like the subscriber terminal 31 which comprises a line receiver 36 and a line driver 37, the master terminal 32 comprises a line receiver 56 and a line driver 57 connected to the communication line 33. A receiver and driver controller 58, similar to the above-described controller 38, controls the line receiver 56 and the line driver 57 through a two-input AND gate 59 as will presently be described. Such similarly named parts of the master and the subscriber terminals 32 and 31 will be distinguished by placing attributes "central" and "local" before the names of the parts in the respective terminals 32 and 31, if necessary. Although a local receiver and driver controller 38 has already been described, the central receiver and driver controller 58 is novel.

The receiver and driver controller 58 is supplied with a state control signal 61 from the central controller (not shown) of the digital telecommunication exchange. As will become clear as the description proceeds, the control signal 61 makes the controller 58 supply at the outset of each communication interval an output signal of the logic "1" level to the AND gate 59 to enable the same. The gate 59 is supplied also with a frame phase control signal 62 from the central controller as depicted in FIG. 2 at (62) and produces a receiver and driver control signal rendered once logic "1" and then once logic "0" in each frame period in synchronism with the frame phase control signal 62. The frame phase control signal 62 is employed primarily for specifying an interval of time during which each receive signal burst should be supplied to the communication line 33. More specifically, the receiver and driver control signal enables the line receiver 56 and disables the line driver 57 when the logic "0" level is applied. When switched to the logic "1" level, the control signal disables the line receiver 56 and enables the line driver 57.

During that stationary interval of time or state in the communication interval during which the synchronism is maintained both for the frame and the bit phases, the line receiver 56 is enabled when send signal bursts $B_1$, $B_2$, . . . reach the master terminal 32. The line receiver 56 converts the send signal bursts to binary received signals in which the burst synchronizing bits are at the logic "1" level. Responsive to the received signals, the receiver and driver controller 58 supplies as its output signal the logic "1" level. The state control signal 61 is no longer necessary. In synchronism with the frame phase control signal 62, the receiver and driver control signal is switched to logic "1" to disable the line receiver 56 and enable the line driver 57. Binary information signals to be transmitted to the subscriber terminal 31 are supplied to a transmitter circuit 63 from an exchange interface 65 interfacing the illustrated circuit with other parts, such as that depicted in FIG. 1 at 35, of the digital telecommunication exchange. The transmitter circuit 63 adds burst synchronizing bits to the respective information signals and delivers the resultant binary signals to the line driver 57, which successfully supplies the resultant binary signals as receive signal bursts $A_1$, $A_2$, . . . to the communication line 33. Being disabled, the line receiver 56 does not respond to the respective signal bursts placed on the communication line 33 by the line driver 57.

In the subscriber terminal 31, a local state control signal 66 activates a transmission controller 67, as will become clear as the description proceeds. When activated, the transmission controller 67 sets its output signal in the logic "1" level. The subscriber terminal 31 comprises a timer 68, a first two-input AND gate 71 for supplying the line receiver 36 with a receiver control signal, and a second two-input AND gate 72 for supplying the line driver 37 with a driver control signal. The timer 69 is novel and will be described in detail later in conjunction with subscriber terminals according to other embodiments of this invention. The line receiver 36 is put in a first mode (enabled) and out thereof (disabled) once in each frame period when the receiver control signal depicted in FIG. 2 at (71) is at the logic "0" and the logic "1" levels, respectively. The line driver 37 is put in a second mode (enabled) and out thereof (disabled) once in each frame period when the driver control signal shown at (72) is at the logic "1" and "0" levels, respectively. Each of the first and the second modes lasts a duration a little longer that the burst length, preferably by a few bit periods longer.

Figure 14:
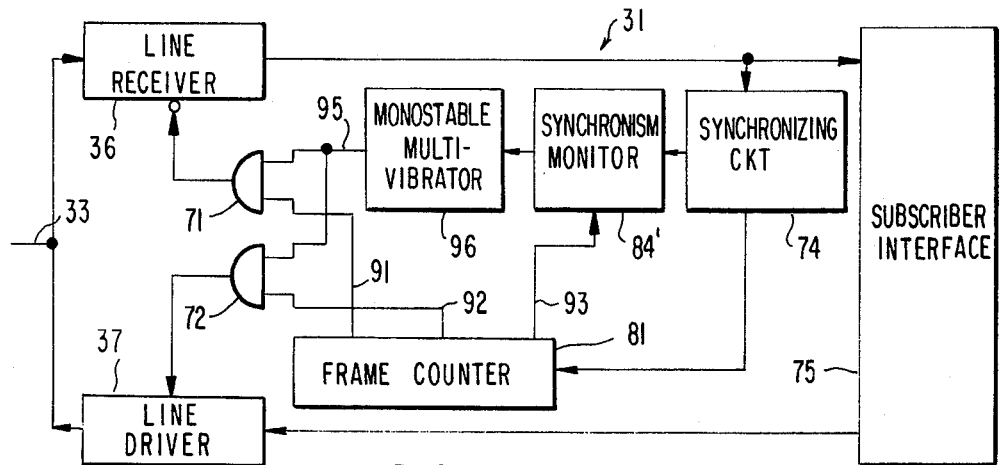
FIG. 14 is a block diagram of a subscriber terminal according to a fourth embodiment of this invention.

During the stationary interval, the receive bursts $A_1$, $A_2$, . . . reach the line receiver 36, which is then in the first mode. Responsive to the receive signal bursts, the line receiver 37 produces binary receive signals with a first frame phase. The burst synchronizing bits F are logic "1" in the receive signals. The receive signals are supplied to a receiver circuit 73 and a synchronizing circuit 74. As will later be described in greater detail, the synchronizing circuit 74 extracts the burst synchronizing bits F from the respective receive signals as indicated in FIG. 2 at (74) and recovers clocks from the receive signals. The extracted burst synchronizing bits and the recovered clocks are supplied to the timer 69 to maintain the timer 69 in synchronism with the frame and the bit phases. The extracted synchronizing bits are supplied also to the transmission controller 67 to maintain its output signal at the logic "1" level. The state control signal 66 is then unnecessary. Controlled by a timing signal supplied from the timer 69, the receiver circuit 73 removes the burst synchronizing bits from the respective receive signals and supplies the resultant signals to a subscriber interface 75 interfacing the illustrated circuit with a microphone/receiver and/or a data terminal facility as depicted in FIG. 14 of the Meyer et al article referred to heretobefore.

The line receiver 36 and the line driver 37 are now put out of the first mode and in the second mode, respectively. Binary information signals to be sent to the master terminal 32 are supplied to a transmitter circuit 76 from the subscriber interface 75. Timed by another timing signal supplied from the timer 69, the transmitter circuit 76 adds burst synchronizing bits to the respective information signals to produce binary send signals, which are sent to the communication line 33 as send signal bursts $B_1, B_2, \ldots$ by the line driver 37 repeatedly put in the second mode. Inasmuch as the line receiver 36 is put out of the first mode, the send signal bursts placed on the communication line 33 do not adversely affect at all the line receiver 36 and the following circuitry.

In the master terminal 32, the line receiver 56 and the line driver 57 are enabled and disabled, respectively, when the send signal bursts arrive thereat. The send signal bursts are converted to binary received signals, which are supplied to a receiver circuit 77 and a sychronizing bit extractor 78. The synchronizing bit extractor 78 extracts the burst synchronizing bits F from the respective received signals as illustrated in FIG. 2 at (78). In contrast to the burst synchronizing bits depicted at (74), the burst synchronizing bits extracted by the extractor 78 are one bit period earlier. This depends on the circuitry for the extraction and has no important meaning, as will become clear later. Responsive to the extracted burst synchronizing bits, the receiver circuit 77, which is kept in synchronism with the frame phase control signal 62, and removes the burst synchronizing bits from the respective received signals and supplies the resulting binary information signals to the exchange interface 65.

When the call is terminated at the subscriber terminal 31, the subscriber interface 75 supplies the transmitter circuit 76 with an information signal including signalling bits indicative of call termination. After a send signal burst including the call termination signalling bits is sent by the line driver 37 towards the master terminal 32, the state control signal 66 is set to a state representative of call termination. Responsive to the control signal 66, the transmission controller 67 is deactivated to supply a logic "0" output signal to the first and the second AND gates 71 and 72 to disable the same. The line receiver 36 is put in the first mode to be ready for another call that may arrive at the subscriber terminal 31 at any time. The line driver 37 is put out of the second mode.

The send signal burst reaches the master terminal 32 while the line receiver 56 is put in the enabled state as in the communication interval. The receiver circuit 77 supplies the exchange interface 65 with an information signal indicative of call termination. The information signal makes the central controller switch the state control signal 61 to a state indicative of call termination. Responsive to the state control signal 61, the receiver and driver controller 58 supplies a logic "0" output signal to the AND gate 59. The line receiver 56 is kept in the enabled state irrespective of the frame phase control signal 62 to be ready for another call that may arrive at the master terminal 32 at any time. The line driver 57 is disabled.

When the call is terminated at the master terminal 32, the exchange interface 65 supplies the transmitter circuit 63 with an information signal including a signalling bit indicative of call termination. After a receive signal burst including the signalling bit is supplied by the line driver 57 to the communication line 33, the state control signal 61 is switched to a state indicative of call termination. Responsive to the state control signal 61, the receiver and driver controller 58 supplies a logic "0" output signal to the AND gate 59. The line receiver 56 is kept in the enabled state, irrespective of the state of the frame phase control signal 62, to be ready for another call that may reach the master terminal 32 at any time. The line driver 57 is disabled.

The receive signal burst reaches the subscriber terminal 31 while the line receiver 36 is in the first mode, as in the communication interval. The receiver circuit 73 supplies the subscriber interface 75 with an information signal including a signalling bit representative of call termination. The state control signal 66 is set to a state indicative of call termination. Responsive to the state control signal 66, the transmission controller 67 is deactivated to supply a logic "0" output signal to the first and the second AND gates 71 and 72. The line receiver 36 is left in the first mode to be ready for another call that may arrive at the subscriber terminal 31 at any time. The line driver 37 is put out of the second mode.

Turning to FIG. 4, it is assumed that a call is initiated at the subscriber terminal 31. The state control signal 66 is put into a state indicative of call origination. The transmission controller 67 is activated to render its output signal logic "1" as depicted at (67) and marked with a triangle. The first and the second AND gates 71 and 72 are enabled. The timer 69 supplies logic "1" output signals with local frame and bit phases to the first and the second AND gates 71 and 72, respectively. The driver control signal produced by the second AND gate 72 is rendered logic "1" as shown at (72). The line receiver 36 is put out of the first mode and the line driver 37 in the second mode. The subscriber interface 75 supplies the transmitter circuit 76 with a call originating signal, which may not necessarily be a binary information signal and may be a d.c. pulse representative of the logic "1" level and having an appreciable pulse width, such as of the order of the burst length. The line driver 37 sends the call originating signal to the master terminal 32. The timer 69 sets the driver control signal at the logic "0" level in due course and subsequently to logic "1" level, as depicted at (72) in FIG. 4. Preferably, the driver control signal is kept at logic "0" until an extracted burst synchronizing bit is supplied to the timer 69 as will shortly be described. The sent call originating signal will be called a send signal burst X, which is illustrated at (31). The send signal burst X may have a duration shorter than the burst length and may not be in synchronism with the second frame phase, nor with the first and the bit phases.

In the master terminal 32, the line receiver 56 is left in the enabled state as described hereinabove and supplies the send signal burst X shown at (32) to the receiver and driver controller 58 to make the same supply the AND gate 59 with a logic "1" output signal indicated at (58). The send signal burst X need not be a d.c., and may comprise a burst synchronizing bit. The burst synchronizing bit likewise activates the receiver and driver controller 58. Alternatively, the line receiver 56 may supply the send signal burst X to the exchange interface 65 through the receiver circuit 77. In this event, the central controller sets the state control signal 61 to a state indicative of call origination for use in activating the receiver and driver controller 58. At any rate, the line receiver 56 is disabled when the frame phase control signal 62 is rendered logic "1" as shown at (62). The line driver 57 is enabled. The exchange interface 65 supplies a binary information signal to the transmitter circuit 63. As described before, a receive signal burst $A_1$ is supplied to the communication line 33 as illustrated at (32). The information signal need not carry any information.

In the subscriber terminal 31, the receiver control signal produced by the first AND gate 71 is rendered logic "0" while the driver control signal, depicted at (72), is set to the logic "0" level after transmission of the send signal burst X. The line receiver 36 therefore receives the receive signal burst $A_1$ and converts the same into a binary receive signal. The synchronizing circuit 74 extracts the burst synchronizing bit F from the receive signal as illustrated at (74) and supplies the extracted burst synchronizing bit to the transmission controller 67 to place its output signal at the logic "1" level. The state control signal 66 is no longer necessary although the same may be used instead of the extracted burst synchronizing bit in keeping the output signal of the transmission controller 67 at the logic "1" level. The extracted burst synchronizing bit is supplied also to the timer 69 to synchronize the same with the first frame phase and the bit phase. The second frame phase in which the line driver 37 is put in the second mode is also synchronized with the first frame phase.

It may be that several receive signal bursts, such as $A_1$, are necessary after the call originating signal burst X has been sent out in synchronizing the subscriber terminal 31 with the frame and the bit phases. In this event, the line receiver 36 is most preferably kept in the first mode throughout the call originating interval of several frame periods. At any rate, the call originating interval is now followed by a communication interval. The subscriber terminal 31 may or may not comprise the hook switch pair.

A call originates with the master terminal 32 as a result of a call arriving thereat from another subscriber terminal in the network. Responsive to the arriving call, the central controller sets the state control signal 61 into a state indicative of call origination. The receiver and driver controller 58 supplies a logic "1" output signal to the AND gate 59. Also, the exchange interface 65 supplies a binary information signal to the transmitter circuit 63. The frame phase control signal 62 is concurrently set to the logic "1" level to subsequently specify the frame phase. The line driver 57 supplies a receive signal burst to the communication line 33. As it is in the first mode, the local line receiver 36 deals with the receive signal burst as before to synchronize the subscriber terminal 31 with the frame and the bit phases.

Figure 5:
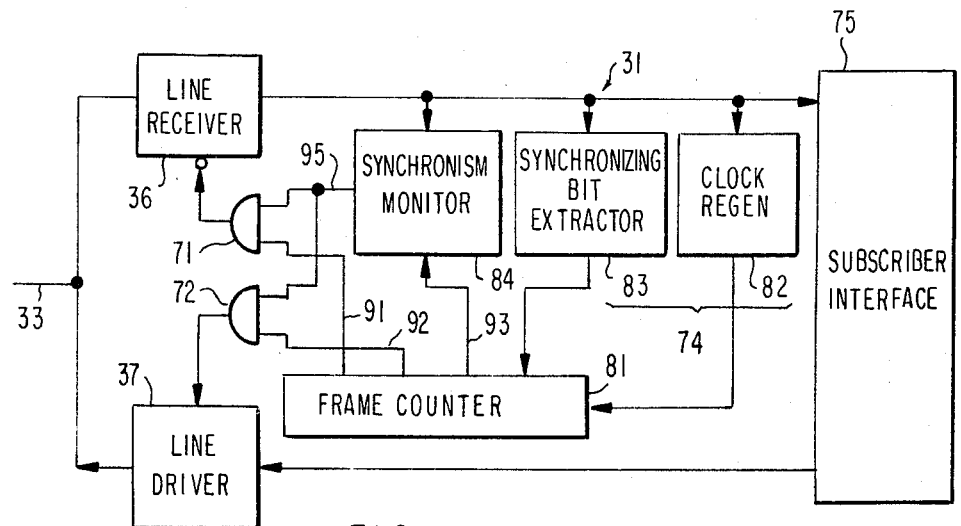
FIG. 5 is a block diagram of a subscriber terminal according to a second embodiment of this invention.

Referring now to FIG. 5, a subscriber terminal 31 according to a second embodiment of this invention comprises a line receiver 36, a line driver 37, first and second two-input AND gates 71 and 72, and a subscriber interface 75, as the case of the subscriber circuit 31 described with reference to FIG. 3. The timer 69 includes a frame counter 81. The synchronizing circuit 74 is depicted as consisting of a clock regenerator 82 and a synchronizing bit extractor 83. The receiver and the transmitter circuits 73 and 76 are included in the subscriber interface 75. The gates 71 and 72 are enabled and disabled by a synchronism monitor 84 rather than by the transmission controller 67. It is therefore possible to understand that the state control signal 66 described with reference to FIG. 3 is supplied to the synchronism monitor 84 through a signal lead, not shown.

Responsive to receive signal bursts, such as $A_1$ shown in FIG. 2 or 4, the line receiver 36 produces binary receive signals with a first frame phase as before when put in a first mode in synchronism with the receive signal bursts. The logic "0" level in each binary receive signal is not different from the level present on a signal lead for the receive signals during absence of the receive signals. It may also be mentioned that, the last binary bit of each binary receive signal is in practice the d.c. balancing bit, which is rendered logic "1" when all information and signalling bits in the receive signal are at the logic "0" level.

Figure 6:
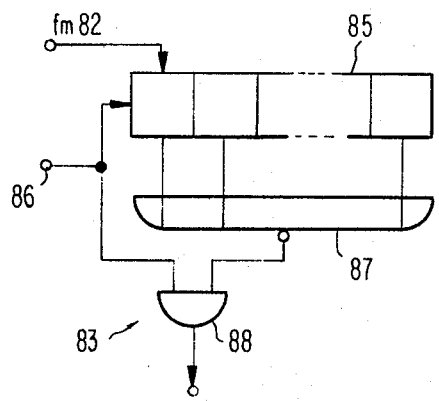
FIG. 6 is a block diagram of a synchronizing bit extractor for use in the subscriber terminal depicted in FIG. 5.

Turning momentarily to FIG. 6, the synchronizing bit extractor 83 may comprise an (N-1)-stage shaft register 85 stepped by the recovered clocks for storing (N-1) binary bits present on the signal lead for the receive signals, where N represents the burst length in terms of bits. The signal lead will hereafter be represented by a signal input terminal 86.

Binary bits produced from the respective shift register stages are supplied to an (N-1)-input NOR gate 87 which supplies its output signal to an input terminal of a NAND gate 88, which has another input terminal supplied with the binary bits from the signal input terminal 86. When a burst synchronizing bit is supplied to the signal input terminal 86, successively preceding binary bits have the logic "0" level. The NAND gate 88 therefore extracts the burst synchronizing bit. When the d.c. balancing bit is given the logic "1" level, the burst synchronizing bit is shifted to the last stage of the shift register 85. The NAND gate 88 does not produce a logic "1" output signal. The illustrated synchronizing bit extractor 83 is, however, somewhat objectionable because of the large shift register 85 and NOR gate 87 and accordingly appreciable power consumption. More preferable synchronizing bit extractors will be described later.

Figure 7:
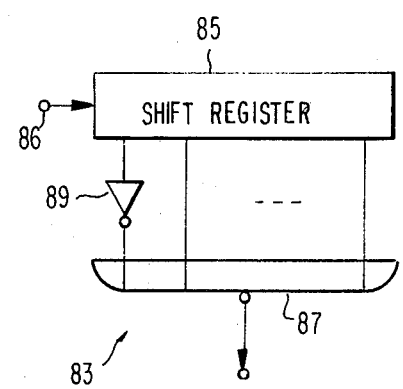
FIG. 7 is a block diagram of another synchronizing bit extractor for use in the subscriber terminal illustrated in FIG. 5.

Turning further to FIG. 7, the synchronizing bit extractor 83 may comprise an N-stage shift register 85' and an N-input NOR gate 87'. Instead of the NAND gate 88, an inverter 89 is connected between the first stage of the shift register 85' and the NOR gate 87'. The NOR gate 87' produces the extracted burst synchronizing bit.

Referring back to FIG. 5 and referring to FIG. 2 again, the frame counter 81 is used for counting the recovered clocks. While the clocks are being counted, the extracted burst synchronizing bits, depicted in FIG. 2 at (74), repeatedly load a predetermined count in the counter 81. Examples of similar counters will be described later. The counter 81 counts the recovered clocks to successive counts. For example, each extracted burst synchronizing bit resets the counter 81 to zero. The counter 81 counts up at least to the frame period in terms of bits. Inasmuch as each extracted burst synchronizing bit is representative of the first frame phase, the predetermined count represents a local frame phase. The successive counts are indicative of successive frame phases relative to the local frame phase.

The counter 81 produces first and second timing signals 91 and 92 representative of first and second preselected phases relative to the local frame phase. In the illustrated example, the first and the second timing signals 91 and 92 are set to the logic "0" and "1" levels, respectively, substantially during the burst length with an interval nearly equal to the guard time $t_g$ left therebetween as depicted in FIG. 2 at (91) and (92). Throughout the stationary interval, the first and the second preselected phases are coincident with the first and the second frame phases and are consequently in synchronism with the frame and the bit phases of the send and the receive signal bursts, such as $A_1$ and $B_1$. The counter 81 furthermore produces a third timing signal 93 representative of a third preselected phase relative to the local frame phase. Throughout the stationary interval, the third timing signal 93 only momentarily rises as indicated at (93) concurrently with the burst synchronizing bit of each binary receive signal and accordingly has a trailing edge substantially concurrent with the leading edge of each extracted burst synchronizing bit. As will later be described, decoders may be used for producing the first through the third timing signals 91 to 93.

Figure 8:
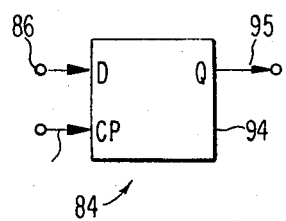
FIG. 8 shows a frame synchronism monitor for use in the subscriber terminal depicted in FIG. 5.

Turning temporarily to FIG. 8, the synchronism monitor 84 may be a flip-flop 94 having a data terminal D successively supplied with the binary bits present on the signal lead for the binary receive signals as indicated by the signal input terminal 86 described with reference to FIG. 6, a clock input terminal CP supplied with the third timing signal 93, and an output terminal Q for producing a gate enable signal 95. The third timing signal 93 latches the binary bit supplied to the data input terminal D. The burst synchronizing bits of the respective receive signals are therefore latched to repeatedly give the gate enable signal 95 the logic "1" level. The gate enable signal 95 therefore indicates whether the local frame phase of the frame counter 81 is in or out of synchronism with the first frame phase by the logic "1" and "0" levels, respectively. When the synchronism is correct, the first and the second AND gates 71 and 72 are enabled. Otherwise, the gates 71 and 72 are disabled. As described before, the gate enable signal 95 may be rendered logic "1" by the state control signal 66 (FIG. 3) particularly at the beginning of a call originating interval.

Turning back to FIG. 5 and referring to FIG. 2 once again, the operation of the subscriber terminal 31 in FIG. 5 is not much different from that described with reference to FIGS. 2 through 4 during all of the stationary, call originating, and call terminating intervals. More specifically, the first timing signal 91 sets the receiver control signal to the logic "0" level to put the line receiver 36 in the first mode substantially immediately upon the arrival of the receive signal bursts $A_1$, $A_2$, . . . at the line receiver 36. The second timing signal 92 sets to the logic "1" level the driver control signal to put the line driver 37 in the second mode substantially during the intervals in which the send signal burst $B_1$, $B_2$, . . . are to be sent to the communication line 33. Otherwise, the line receiver 36 and the line driver 37 are put out of the first and the second modes, respectively, in particular synchronism has not been correctly established.

Figure 9:
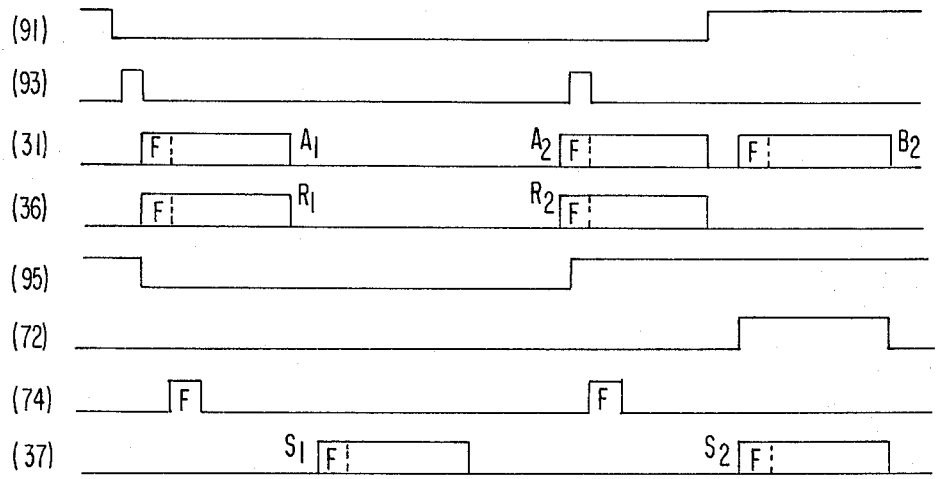
FIG. 9, depicted below

Turning to FIG. 9, it is assumed that the local frame phase has been shifted forward so as to lead the first frame phase during the communication interval. Such a forward shift may take place at the beginning of the call originating interval. The local frame phase is represented by the first and the third timing signals 91 and 93 at (91) and (93). The line receiver 36 is put in the first mode during the logic "0" interval of the first timing signal 91. Inasmuch as a receive signal burst $A_1$ depicted at (31) lags behind relative to the local frame phase, at least a leading end portion of a binary receive signal $R_1$ is produced by the line receiver 36 as shown at (36). The third timing signal 93 rises in advance of the burst synchronizing bit in the receive signal $R_1$ as seen from the illustration at (93) and (36). The binary bit latched in the flip-flop 94 (FIG. 8) by the leading third timing signal edge is a binary bit present on the signal lead for the receive signals prior to the receive signal $R_1$ and has therefore the logic "0" level. The gate enable signal 95 is rendered logic "0" as depicted at (95). The driver control signal produced by the second AND gate 72 is kept at logic "0" as shown at (72) irrespective of the states of the first through third timing signals 91 to 93. The synchronizing circuit 74 extracts the burst synchronizing bit as depicted at (74) independently of the local frame phase. The predetermined count is loaded in the frame counter 81 with the first frame phase of the receive signal burst $A_1$. The local frame phase is thereafter put in synchronism with the first frame phase and also with the bit phase. Inasmuch as the line driver 37 remains out of the second mode, a binary send signal $S_1$ supplied thereto as shown at (37) is not sent to the communication line 33 and hence the line receiver 36 (put meanwhile in the first mode) and other parts of the subscriber terminal 31 are not disturbed.

Another receive signal burst $A_2$ reaches the line receiver 36 with the first frame phase and is converted thereby to another binary receive signal $R_2$. Inasmuch as the frame counter 81 is now correctly phased, the third timing signal 93 latches the burst synchronizing bit in the receive signal $R_2$. The gate enable signal 95 is switched to the logic "1" level. The receiver control signal, however, remains logic "0" during the duration of the logic "0" first timing signal 91 depicted at (91). The receive signal burst $A_2$ is therefore correctly dealt with. The driver control signal produced by the second AND gate 72 rises concurrently with the second timing signal 92 as shown at (72). Prior to this rise, the line receiver 36 is put out of the first mode. At this time, the line driver 37 is put in the second mode to correctly send another binary send signal $S_2$ to the communication line 33 as another send signal burst $B_2$. Synchronism is thus always correctly recovered in a frame period T.

Figure 10:
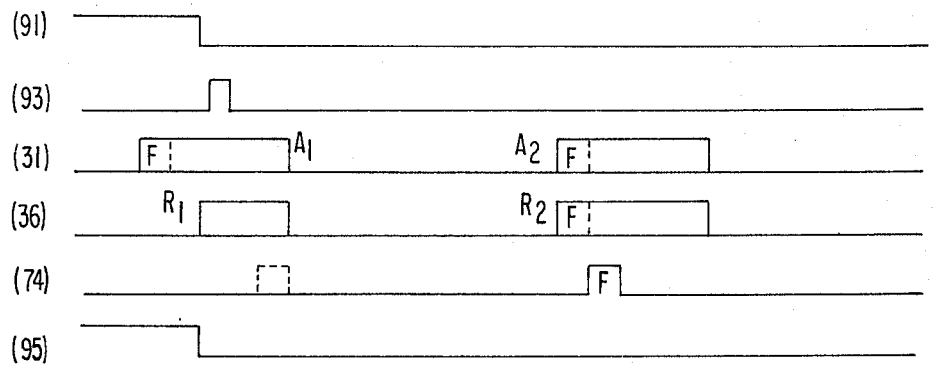
FIG. 10 shows several signals for use in describing operation of the subscriber terminal depicted in FIG. 5.

Turning further to FIG. 10, it will now be assumed that the local frame phase lags behind the first frame phase. The first and the third timing signals 91 and 93, representative of the lagging local frame phase, therefore vary as shown at (91) and (93). The line receiver 36 is put in the first mode during or after arrival of a receive signal $A_1$ at the subscriber terminal as exemplified at (31). The line receiver 36 will not produce a binary receive signal $R_1$ or will produce only a trailing end portion as exemplified at (36). Either when the receive signal burst $A_1$ greatly leads relative to the third timing signal 93 or when a logic "0" bit is present in the receive signal $R_1$ simultaneously with the rise of the third timing signal 93, the gate enable set to 95 depicted at (95) is given the logic "0" level. The line receiver 36 and the line driver 37 are kept in the first mode respectively and out of the second mode. The synchronizing circuit 74 does not produce a logic "1" signal if no receive signal $R_1$ is produced by the line receiver 36. The frame counter 81 is left running by the local frame phase. The synchronizing circuit 74 will produce a false burst synchronizing bit depicted at (74) by dashed lines if either an information bit or a signalling bit is rendered logic "1" for the first time in that part of the receive signal $R_1$ which is produced by the line receiver 36. The false burst synchronizing bit sets the predetermined count in the counter 81. In either event, the local frame phase is left out of synchronism.

The line receiver 36 is kept in the first mode when a next following receive signal burst $A_2$ shown at (31) reaches the subscriber terminal 31. A binary receive signal $R_2$ is entirely produced by the line receiver 36 as shown at (36). The frame counter 81 is not yet synchronized. The third timing signal 93 will not appear concurrently with the burst synchronizing bit in the receive signal $R_2$. The gate enable signal 95 is kept at the logic "0" level. The line driver 37 is kept out of the second mode irrespective of the states of the first through the third timing signals 91 to 93. The synchronizing circuit 74 now extracts a correct burst synchronizing bit from the receive signal $R_2$ as depicted at (74) by full lines. Although the gate enable signal 95 still indicates collapse of synchronism, the frame counter 81 is pulled into correct synchronism by the correctly extracted burst synchronizing bit. Before receipt of a next following receive signal burst (not shown), the subscriber terminal 31 is completely synchronised. The synchronism is therefore recovered in two frame periods 2T in this event.

Figure 11:
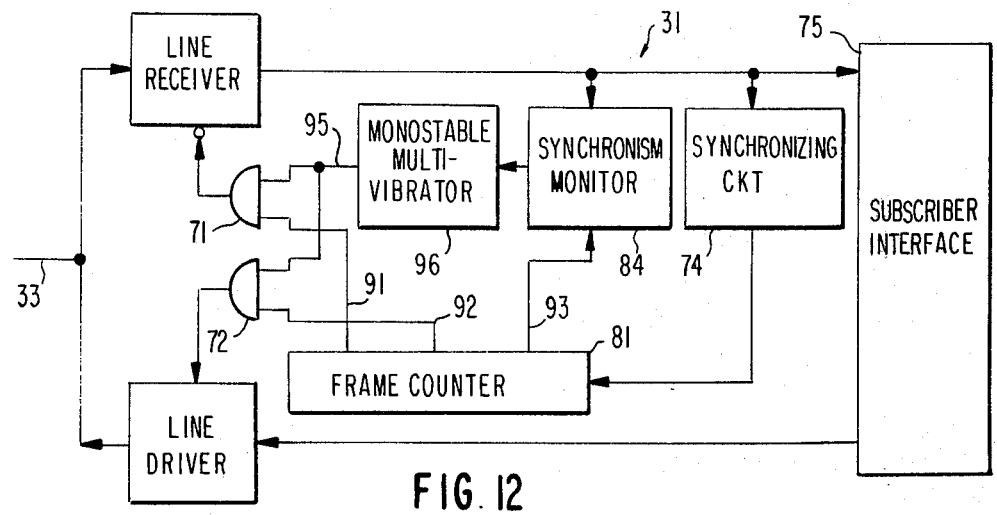
FIG. 11 is a block diagram of a subscriber terminal according to a third embodiment of this invention.

Referring to FIG. 11, a subscriber terminal 31 according to a third embodiment of this invention comprises similar parts designated by like reference numerals. Build down of the signal produced by the synchronism monitor 84 is, however, used as a trigger signal for a monostable multivibrator 96 for producing the gate enable signal 95 at the logic "0" level during a prdetermined duration, such as one frame period T. Besides the interval of time during which the first timing signal 91 is at the logic "0" level, the line receiver 36 is put in the first mode when the gate enable signal 95 is rendered logic "0" for the predetermined duration after out of synchronism is found by the synchronism monitor 84. Meanwhile, the line driver 37 is put out of the second mode. A receive signal burst is therefore converted to a binary receive signal even when synchronism has not been established. Operation during the stationary interval is similar to that already described with reference to FIG. 2 and will not be described further in detail.

Figure 12:
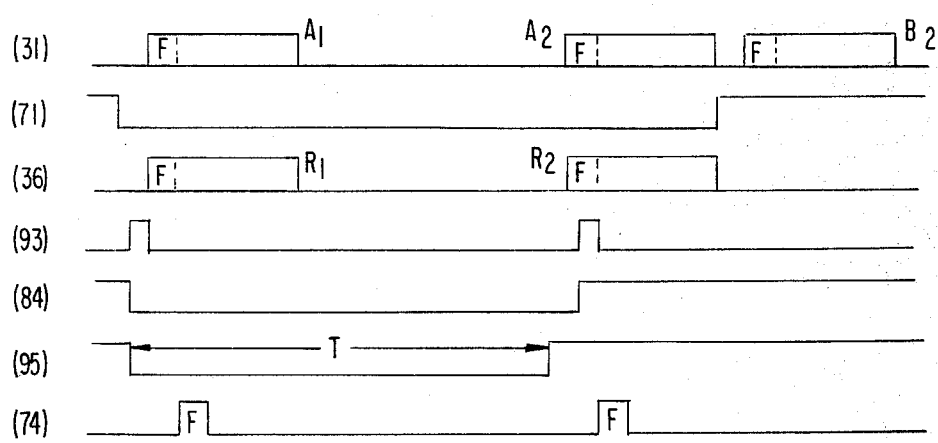
FIG. 12 shows several signals for use in describing operation of the subscriber terminal depicted in FIG. 11.

Turning to FIG. 12, it will be presumed that the local frame phase leads the first frame phase and that a receive signal burst $A_1$ reaches the subscriber terminal 31 as depicted at (31) a little later than the instant at which the receiver control signal produced by the first AND gate 71 is rendered to logic "0" as shown at (71). The line receiver 36 produces at least a leading end portion of a binary receive signal $R_1$ depicted at (36). The third timing signal 93 shown at (93) builds up rises either prior to or after appearance of the burst synchronizing bit in the receive signal $R_1$ depending on the amount of lead of the local frame phase. If the rise is earlier than the production of the receive signal $R_1$ or concurrently with the appearance of a logic "0" level in the receive signal $R_1$, the output signal of the synchronism monitor 84 is rendered logic "0" as depicted at (84). The monostable multivibrator 96 renders the gate enable signal 95 logic "0" during a frame period T as shown at (95). The receiver control signal is kept at logic "0" in the meantime as shown at (71). Inasmuch as the line driver 37 is put out of the second mode, no send signal burst is sent to the communication line 33 for the time being. In any event, the synchronizing circuit 74 extracts the burst synchronizing bit of the receive signal $R_1$ as shown at (74). The local frame phase is at once synchronized with the first frame phase. The receiver control signal is therefore kept at the logic "0" level, now by the first timing signal 91 rather than by the gate enable signal 95, as shown at (71). A next following receive signal burst $A_2$ and the following receive signal bursts are correctly dealt with.

Figure 13:
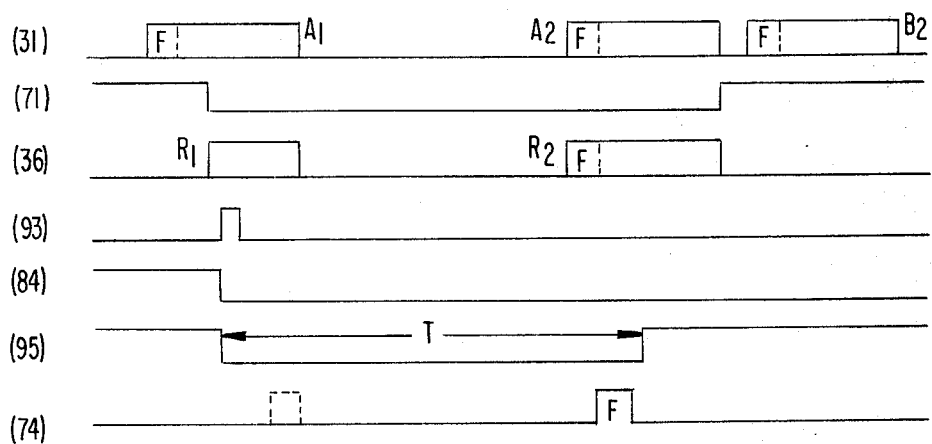
FIG. 13 shows several signals for use in describing operation of the subscriber terminal illustrated in FIG. 11.

Turning further to FIG. 13, it is here assumed that the local frame phase lags behind the first frame phase. When a receive signal burst $A_1$ reaches the subscriber terminal 31 as shown at (31), the receiver control signal produced by the first AND gate 71 is not yet rendered logic "0" as depicted at (71). The line receiver 36 produces either no binary receive signal or only a trailing end portion of a binary receive signal $R_1$ as shown at (36). As described with reference to FIG. 10, the third timing signal 93 shown at (93) will render the output signal of the synchronism monitor 84 logic "0" as shown at (84). The gate enable signal 95 shown at (95) is rendered logic "0" during one frame period T thereafter. The synchronizing circuit 74 may or may not extract a false burst synchronizing bit shown at (74) by dashed lines. In any event, a next following receive signal burst $A_2$ is converted to at least a leading end portion of a binary receive signal $R_2$ since the line receiver 36 remains in the first mode. The synchronizing circuit 74 correctly extracts the burst synchronizing bit of the receive signal $R_2$. The frame counter 81 is put into correct phase. The first timing signal 91 takes over the gate enable signal 95 in keeping the line receiver 36 in the first mode throughout the burst length of the receive signal burst $A_2$. Synchronism is thus recovered in one frame period T in this example.

Figure 15:
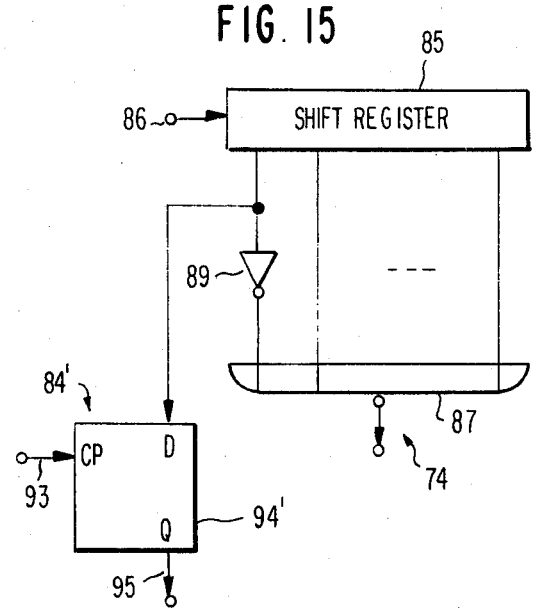
FIG. 15, drawn on the right side of FIG. 8, is a block digram of a synchronizing bit extractor and a frame synchronism monitor for use in the subscriber terminal shown in FIG. 14.

Referring to FIGS. 14 and 15, a subscriber terminal 31 according to a fourth embodiment of this invention comprises similar parts designated by like reference numerals as before. The synchronism monitor, designated here by 84' is, however, supplied from the synchronizing circuit 74 rather than from the line receiver 36. The synchronizing circuit 74 may comprise a shift register 85' supplied from the signal input terminal 86, a NOR gate 87', and an inverter 89 as illustrated with reference to FIG. 7. The synchronism monitor 84' may comprise a flip-flop 94' as illustrated with reference to FIG. 8. The data input terminal D is, however, supplied with the first-stage output signal of the shift register 85', namely, that binary bit present on the signal lead for the binary receive signals which next follow the bit extracted by the synchronizing circuit 74. Synchronism is therefore monitored by the phase at which the burst synchronizing bit is extracted rather than by a phase one clock earlier as described with reference to FIGS. 2, 9, 10, 12, and 13. The third timing signal 93 should be produced accordingly one clock later than that used in the subscriber terminal described with reference to FIG. 5 or 11. Operation during the stationary interval is not different from that described heretobefore and a description thereof hence will be omitted.

Figure 16:
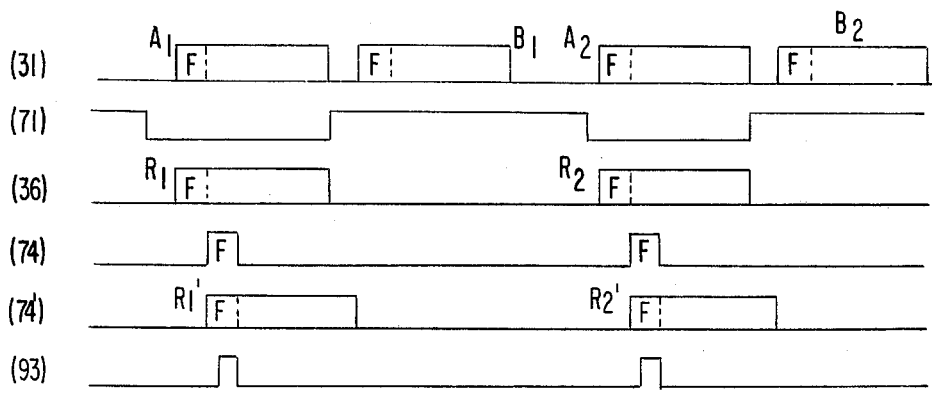
FIG. 16 shows several signals for use in describing operation of the subscriber terminal depicted in FIG. 14.

Turning to FIG. 16, it is now assumed the local frame phase leads the first frame phase. A receive signal burst $A_1$ reaches the subscriber terminal 31 as shown at (31) after the receiver control signal produced by the first AND gate 71 has already been rendered logic "0" as depicted at (71). At least a leading end portion of a binary receive signal $R_1$ is produced by the line receiver 36 as illustrated at (36). The synchronizing circuit 74 extracts the correct burst synchronizing bit depicted at (74). A one-clock delayed binary receive signal $R_1'$ is supplied to the synchronism monitor 84' from the synchronizing circuit 74 as shown at (74'). The burst synchronizing bit of the delayed receive signal $R_1'$ is correctly latched by the third timing signal 93 depicted at (93). The frame counter 81 is pulled into correct synchronism at once. The gate enable signal 95 is kept at the logic "1" level to indicate correct synchronism. The receive signal burst $A_1$ is entirely converted to the receive signal $R_1$. The time required in recovering the synchronism is zero.

Figure 17:
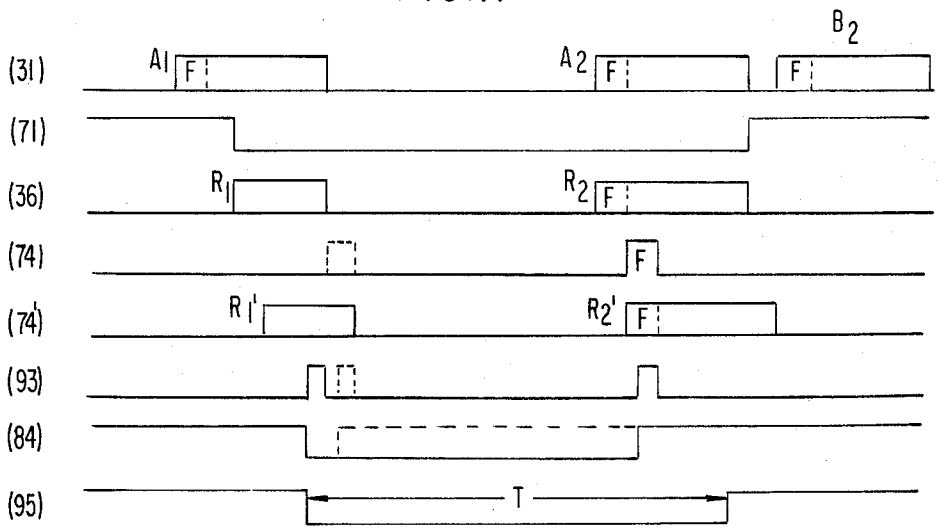
FIG. 17 shows several signals for use in describing operation of the subscriber terminal illustrated in FIG. 14.

Turning further to FIG. 17, it is assumed the local frame phase now lags behind the first frame phase. When the subscriber terminal 31 receives a receive signal burst $A_1$ shown at (31), the receiver control signal produced by the first AND gate 71 is not yet rendered logic "0" as depicted at (71). The line receiver 36 produces either no binary receive signal or a binary receive signal $R_1$ converted from only a trailing end portion of the receive signal burst $A_1$ indicated at (36). As described above, the synchronizing circuit 74 may or may not produce a logic "1" signal as shown at (74). A one-bit delayed receive signal $R_1'$ may be supplied to the synchronism monitor 84' from the synchronizing circuit 74 as shown at (74'). If the delayed receive signal is not produced at all or includes a logic "0" bit at the rising edge of the third timing signal 93 depicted at (93) by full lines, the output signal of the synchronizing monitor 84' is rendered logic "0" as shown at (84). The build down triggers the monostable multivibrator 96. The gate enable signal 95 is rendered logic "0" during one frame period T to indicate out of synchronism.

If a logic "1" bit is found in the receive signal $R_1$ subsequent to a decision of out of synchronism by the synchronism monitor 84', the sychronizing circuit 74 extracts the logic "1" bit as a false burst synchronizing bit as exemplified at (74) by dashed lines. The frame counter 81 is shifted further backwards and again produces the third timing signal 93 as indicated at (93) by dashed lines. The output signal of the synchronism monitor 84' rises, as shown by dashed lines at (84). Because it is not triggered at the rise of the output signal, the monostable multivibrator 96 keeps the gate enable signal 95 at logic "0" until the lapse of the one frame period. If no logic "1" bit is found in the delayed receive signal, the output signal of the synchronism monitor 84' remains logic "0" until a logic "1" bit is found in the binary bits that successively appear in the input signal of the synchronism monitor 84' as depicted by full lines at (84). The counter 81 is left running at the local frame phase. The gate enable signal 95 is kept at logic "0" also during the one frame period. During the one frame period, the line receiver 36 and the line driver 37 are kept in the first mode and out of the second mode, respectively.

Another receive signal burst $A_2$ will arrive at the subscriber terminal 31 as depicted at (31) while the receiver control signal produced by the first AND gate 71 remains at logic "0" as shown at (71). The line receiver 36 produces at least the leading end portion of a binary receive signal $R_2$ as depicted at (36). The synchronizing circuit 74 correctly extracts the burst synchronizing bit from the receive signal $R_2$ as shown at (74) and will produce at least a leading end portion of a one-bit delayed receive signal $R_2'$ as depicted at (74'). The extracted burst synchronizing bit puts the counter 81 into correct synchronism. The burst synchronizing bit of the delayed receive signal is latched by the third timing signal 93. The gate enable signal 95 produced by the synchronism monitor 84' is switched to logic "1" to indicate correct synchronism as shown at (95). Since the local frame phase is already correct, the receiver control signal produced by the first AND gate 71 is kept at logic "0" by the first timing signal 91 irrespective of the change of the gate enable signal 95 to the logic "1" level. The time for recovery of synchronism is one frame period T.

In connection with the subscriber terminal 31 illustrated with reference to FIG. 11 or 15, the time constant of the monostable multivibrator 96 may be such that both the receiver and the driver control signals are rendered logic "0" throughout the frame period in which the output signal of the synchronism monitor 84 or 84' is switched to the logic "0" level. In order to cope with the backward shift of the local frame phase as well as the forward shift, the time constant may be rendered greater than one frame period so that the gate enable signal 95 may remain at logic "0" during several frame periods.

Referring now to FIG. 18, therein is shown a subscriber circuit according to a modification of the circuit illustrated with reference to FIG. 5 and that illustrated with reference to FIG. 11 from which the monostable multivibrator 96 is removed, and comprises similar parts designated by like reference numerals as before. The subscriber terminal herein is also a modification of the circuit illustrated with reference to FIG. 14 because a time lag is provided to keep the gate enable signal 95 at logic "0" during a predetermined duration after out of synchronism is found. It is possible to understand that either the synchronism monitor 84, or a combination of the synchronism monitor 84' and the synchronizing circuit 74, comprises first and second flip-flops 94" and 97. The first flip-flop 94" has a data input terminal D supplied with the binary bits present on the signal lead for the binary receive signals present on the signal input terminal 86, a clock input terminal CP supplied with the third timing signal 93, and a preset terminal PR supplied with a preset signal to be presently described. The flip-flop 94" produces an output signal from an output terminal Q. The second flip-flop 97 has a clear input terminal CL supplied with the Q output signal as a clear signal, a data input terminal D pulled to logic "1" a power source $V_{cc}$ through a resistor, a clock input terminal CP supplied with the second timing signal 92 through an inverter 98, and an output terminal Q for producing the gate enable signal 95. The gate enable signal 95 is supplied to the preset terminal PR as the preset signal.

The second AND gate 72 is controlled by the gate enable signal 95 and the second timing signal 92 as before. The first AND gate 71 is accompanied by a single flip-flop 99 having a clear input terminal CL supplied with the gate enable signal 95, a data input terminal D pulled to logic "1" by the power source $V_{cc}$ through the resistor, and a clock input terminal CP supplied with the first timing signal 91. The gate 71 is controlled by a Q output signal of the single flip-flop 99 and the first timing signal 91.

Turning to FIG. 19, it is here assumed that the first and the second timing signals 91 and 92 are logic "1" and "0" at first as depicted at the left end portions of (91) and (92). The Q output signals of the first flip-flop 94", the second flip-flop 97, namely, the gate enable signal 95, and the single flip-flop 99 are logic "1" in the meantime as shown at (94"), (95), and (99). The receiver and the driver control signals produced by the first and the second AND gates 71 and 72 are logic "1" and "0"

for this time period, as illustrated at (71) and (72). The receiver control signal is subsequently switched to logic "0" at the falling edge of the first timing signal 91.

It is now assumed that out of sunchronism is found rather quickly. The Q output signal of the first flip-flop 94" goes to logic "0" as indicated at (94"), thereby clearing the second flip-flop 97. The gate enable signal 95 is rendered logic "0" to indicate loss of synchronism. The first flip-flop 94" is preset to return the Q output signal to logic "1" in preparation for monitoring the state of synchronism. The single flip-flop 99 is cleared to switch the Q output signal to the logic "0" level. The receiver and the driver control signals are held at logic "0" and "1", respectively irrespective of the states of the first through the third timing signals 91 to 93.

The falling edge of the second timing signal 92 latches in the second flip-flop 97 the logic "1" signal supplied to the data input terminal D. After being kept at logic "0" nearly until the end of the frame period in which out of synchronism is detected, the gate enable signal 95 is set to logic "1" to indicate recovery of synchronism. The single flip-flop 99 remains cleared until the logic "1" signal supplied to the data input terminal D is latched by the subsequent rising edge of the first timing signal 91. The receiver control signal is kept at logic "0" all the while. The driver control signal is allowed to rise when the second timing signal 92 next rises.

Referring once more to FIG. 20 and again back to FIG. 2, the master terminal 32 (FIG. 3) may control the subscriber terminal 31 illustrated with reference to any one of FIGS. 3, 5, 11, and 14 by a bit sequence $\{S_i\}$ of the signalling bits. The subscriber terminal 31 decodes the signalling bit sequence with, for example, the signal detector 43 (FIG. 1) to determine the control specified by the master terminal 32. The burst synchronism may also be indicated by some of the signalling bits of the bit sequence, for example, by four leading signalling bits $S_1$ through $S_4$ in each digital signal burst among eight signalling bits $S_1$ to $S_8$ in the burst as depicted in FIG. 20 at A (shown in succession merely for convenience of illustration). Other signalling bits $S_5$ through $S_8$ may be used to specify other control. By way of example, the four leading signalling bits $S_1$ to $S_4$ are collectively used as a burst synchronizing bit when given logic "1001" either in a binary receive signal or in a one-clock delayed binary receive signal, with appearance of two consecutive logic "0" bits prohibited in the remaining signalling bits $S_5$ to $S_8$. Alternatively, the burst format may be modified as illustrated at B. Besides the normal burst synchronizing bit F, each frame includes a signalling bit S and other information bits. The signalling bits $S_1$ through $S_4$ in four consecutive frames among eight successive frames may collectively be used as an additional burst synchronizing bits of the type illustrated with reference to FIG. 20A. Four signalling bits $S_5$ to $S_8$ in the remaining frames may be used for other purposes. When extracted from eight successive frames, the signalling bits $S_1$ through $S_8$ may be successively arranged as indicated at C.

Turning to FIG. 21, a processor for use as a synchronizing bit extractor 83 for extracting the signalling bits $S_1$ through $S_8$ of the type described with reference to FIG. 20C may be an eight-bit memory 101 having a data input terminal IN supplied with the binary bits present on the signal lead for either the binary receive signals or the one-bit delayed receive signals represented by the signal input terminal 86, a clock input terminal CP supplied with a timing signal 102 from the frame counter 81, and an output terminal for producing the signalling bit sequence illustrated in FIG. 20 at C during the stationary interval. After the signalling bits $S_2$ indicated in FIG. 20 at C is latched in the processor, the latched signalling bits are cyclically shifted in the memory 101 while being monitored by a monitor (not shown). When a bit subsequence "1001" appears in the monitored sequence, the monitor understands the subsequence to be the additional burst synchronizing bits and the remaining signalling bits in the sequence to be for some other control purpose. If the local frame phase is incorrect, the monitor will not detect the subsequence "1001" or, alternatively, will find a prohibited succesion of two binary bits.

Figure 22:
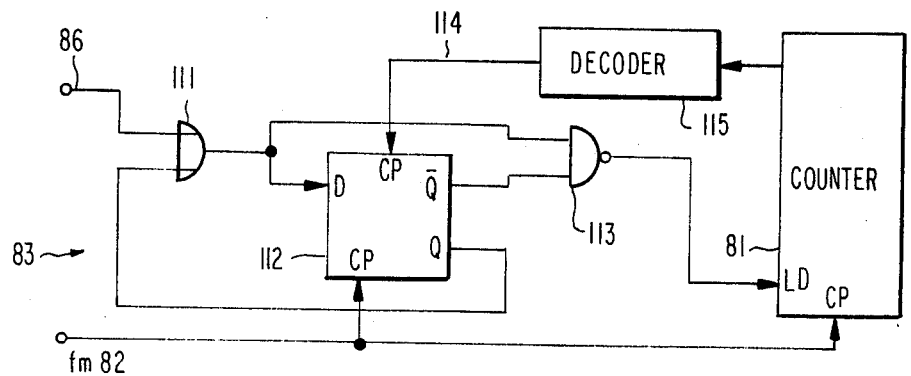
FIG. 22 is a block diagram of a synchronizing bit extractor for use in the subscriber terminal illustrated in any one of FIGS. 3, 5, 11, and 14.
Figure 23:
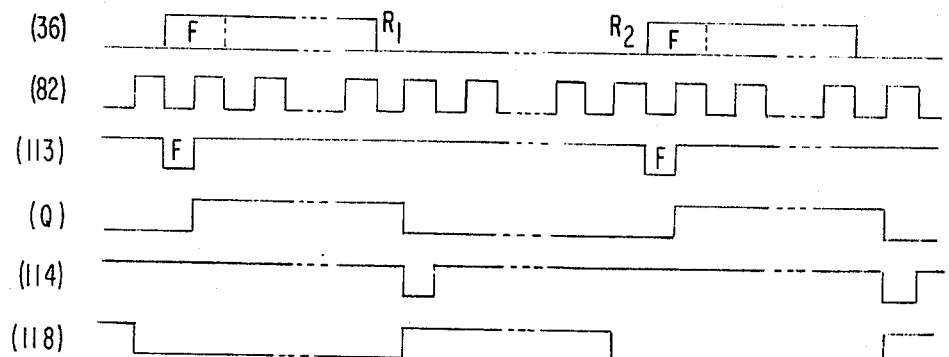
FIG. 23 shows several signals for use in describing operation of the synchronizing bit extractor shown in FIG. 22, together with one more signal for use in describing operation of a similar synchronizing bit extractor.

Referring now to FIG. 22 and a greater part of FIG. 23, a frame synchronizing circuit is shown for synchronizing the frame counter 81 (FIG. 5, 11, or 14) to the burst synchronizing bits F of binary receive signals $R_1$, $R_2$, ... produced by the line receiver 36 as depicted in FIG. 23 at (36) and supplied to the signal input terminal 86. The frame synchronizing circuit and the counter 81 are operable either simultaneously or individually by the recovered clocks or another sequence of clocks which are equivalent to the recovered clocks. The frame synchronizing circuit can be used also for synchronizing the timer 69 (FIG. 3) to the extracted burst synchronizing bits. Merely for convenience, the frame synchronizing circuit will be described in conjunction with the counter 81 and the clocks recovered by the clock regenerator 82, with each clock rendered logic "0" and "1" during a former and a latter half of each binary bit as shown at (82). The frame synchronizing circuit, except for the counter 81, serves as a synchronizing bit extractor 83. In contrast to the synchronizing bit extractors 83 illustrated in to FIGS. 6 and 7, the synchronizing bit extractor 83 of FIG. 22 is advantageous with regard to size and power consumption. Furthermore, the illustrated synchronizing bit extractor 83 is digitally operable and can readily be manufactured using well known integrated circuit techniques.

The synchronizing bit extractor 83 comprises a two-input OR gate 111 responsive to an OR gate input signal to be shortly described and the binary bits supplied to the signal input terminal 86 for producing an OR gate output signal. A flip-flop 112 has a data input terminal D supplied with the OR gate output signal, a clock input terminal CP supplied with the recovered clocks, a clear input terminal CL supplied with a clear signal, a true output terminal Q for producing a true output signal depicted at (Q) as will presently become clear, and an inverse output terminal $\overline{Q}$ for producing an inverse output signal. The true output signal is supplied back to the OR gate 111 as the OR gate input signal. The OR gate output signal and the inverse output signal $\overline{Q}$ from the flip-flop 112 are supplied to a NAND gate 113, which successively produces the extracted burst synchronizing bits shown at (113) in FIG. 23.

Loaded with a predetermined count by each extracted burst synchronizing bit F supplied to a load input terminal LD, the counter 81 counts the recovered clocks supplied to a clock input terminal CP and produces a fourth timing signal 114 through a decoder 115. The fourth timing signal 114 is supplied to the clear input terminal CL of the flip-flop 112 as the clear signal. When the fourth timing signal 114 is produced during absence of the receive signals as shown at (114), the NAND gate 113 produces the extracted burst synchronizing bits without fail. The fourth timing signal 114 may be called an additional timing signal as the case may be.

It is now assumed the fourth timing signal 114 is in the logic "0" state during absence of the receive signals. The flip-flop 112 is cleared at the falling edge of the fourth timing signal 114, thereby setting the true output signal to the logic "0" level. The OR gate output signal becomes the binary bits supplied from the signal input terminal 86 and has the logic "0" level. The true output signal is kept at logic "0" and the inverse output signal at the logic "1" level. The NAND gate 113 keeps its output signal at the logic "1" level.

When the burst synchronizing bit F is supplied to the OR gate 111, the OR gate output signal is switched to the logic "1" level. Inasmuch as the logic "1" OR gate output signal is not yet latched by any of the recovered clocks during the first half of the burst synchronizing bit F, the NAND gate 113 temporarily sets its output signal. When the recovered clock in question rises in the logic "0" state, the logic "1" OR gate output signal is latched to set the true and the inverse output signals to the logic "1" and "0" levels, respectively. The NAND gate output signal returns to the logic "1" level. Inasmuch as the true output signal is repeatedly latched by the respective recovered clocks until the clear signal appears, both the true output signal and the NAND gate output signal are kept at logic "1" the entire time.

It can now be understood that the fourth timing signal 114 may be produced at any time during absence of the receive signals. When the fourth timing signal 114 remains at logic "1" while a certain one of the recovered clocks is at the logic "1" level, the fourth timing signal 114 becomes logic "0" with a phase different from the phase at which the NAND gate output signal appears. It is therefore possible to shorten the time for recovery of the synchronism.

Figure 24:
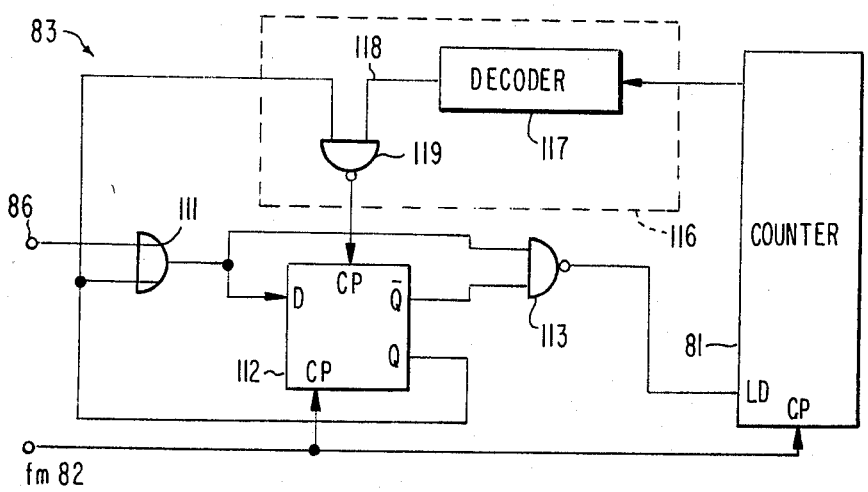
FIG. 24 is a block diagram of another synchronizing bit extractor for use in the subscriber terminal depicted in any one of FIGS. 3, 5, 11, and 14.

Referring to FIG. 24 and again to FIG. 23, the synchronizing bit extractor 83 may comprise similar parts, as described above with reference to FIG. 22, designated by like reference numerals. However, a logic circuit 116 is substituted for the decoder 115 for producing the clear signal. The logic circuit 116 comprises a different decoder 117 responsive to an output signal of the counter 81 for producing a decoded signal 118 rendered logic "1" during a predetermined interval of time in the absence of the binary receive signals as shown in FIG. 23 at (118). The true output signal and the decoded signal 118 are supplied to another NAND gate 119 for producing the clear signal only when the true output signal and the decoded signal 118 are simultaneously at the logic "1" level.

If the flip-flop 112 is cleared, the true output signal is rendered logic "0" to inhibit the clear signal. When the true output signal is at the logic "0" level, the logic "0" is maintained even if the decoded signal 118 changes to the logic "1" level. In any event, the true output signal is logic "0" whenever the decoded signal 118 rises. It is therefore possible by rendering the decoded signal 118 logic "1" as described, to thereafter keep the true output signal at logic "0" throughout the interval during which the receive signals do not appear. The decoded signal 118 changes to logic "0" before appearance of a next succeeding receive signal. The clear signal is again inhibited until the next succeeding receive signal appears. When the burst synchronizing bit F appears in the meanwhile, the NAND gate output signal is produced as before. As can now be understood, latching of the burst synchronizing bit never results in clearing of the flip-flop 112. It is therefore irrelevant at what phase the decoded signal 118 rises. The restriction of the fourth timing signal 114 and accordingly on the clear signal used in the circuit described with reference to FIG. 22 is thus much relaxed.

Figure 25:
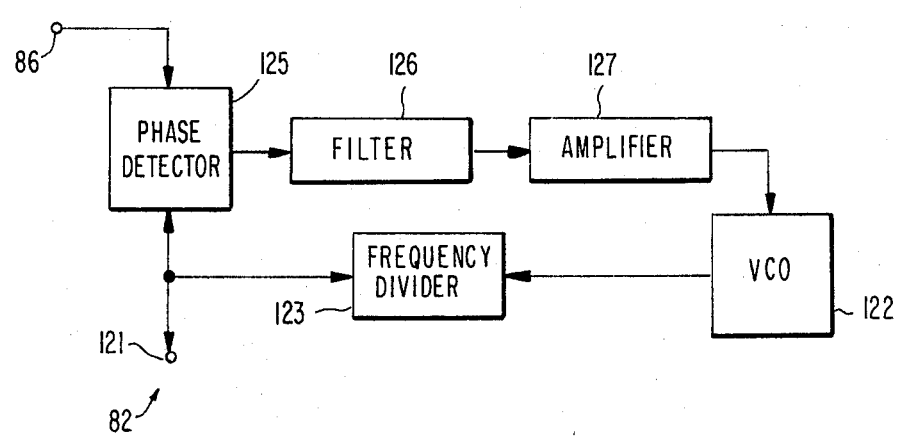
FIG. 25, drawn below

Referring now to FIG. 25, the clock regenerator 82 may be a conventional clock regenerator for recovering master clocks used in the master terminal 32 (FIG. 3) from the binary bits supplied to the signal input terminal 86. The recovered clocks are supplied to a clock output terminal 121. Local clocks generated by a voltage controlled oscillator 122 are frequency divided by a frequency divider 123. A phase detector 125 detects the phase difference between the recovered clocks and the binary bits supplied to the signal input terminal 86. An analog output signal of the phase detector 125 is fed back to the voltage controlled oscillator 122 through a phase lock loop comprising a low-pass filter 126 and an amplifier 127.

Figure 26:
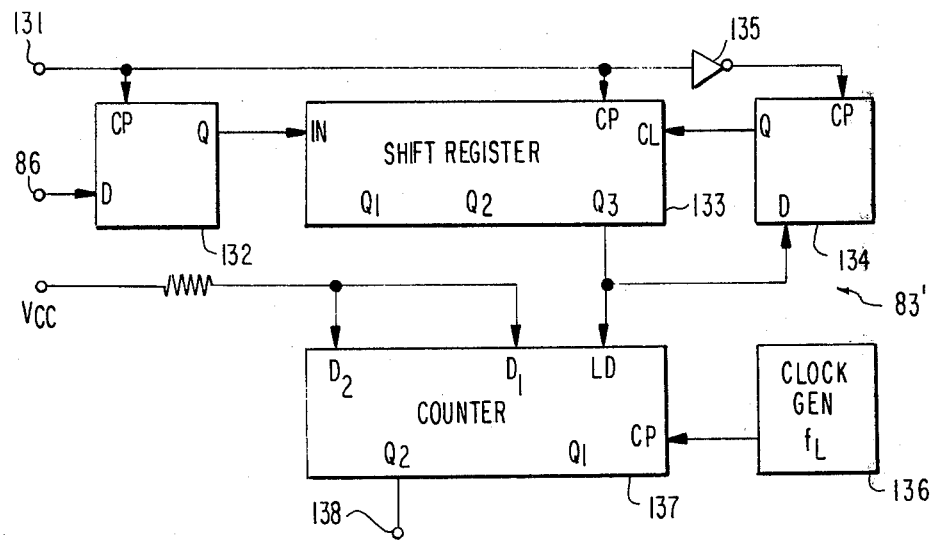
FIG. 26 is a block diagram of a synchronizing bit extractor and a clock generator for use in the subscriber terminal depicted in any one of FIGS. 3, 5, 11, and 14.
Figure 27:
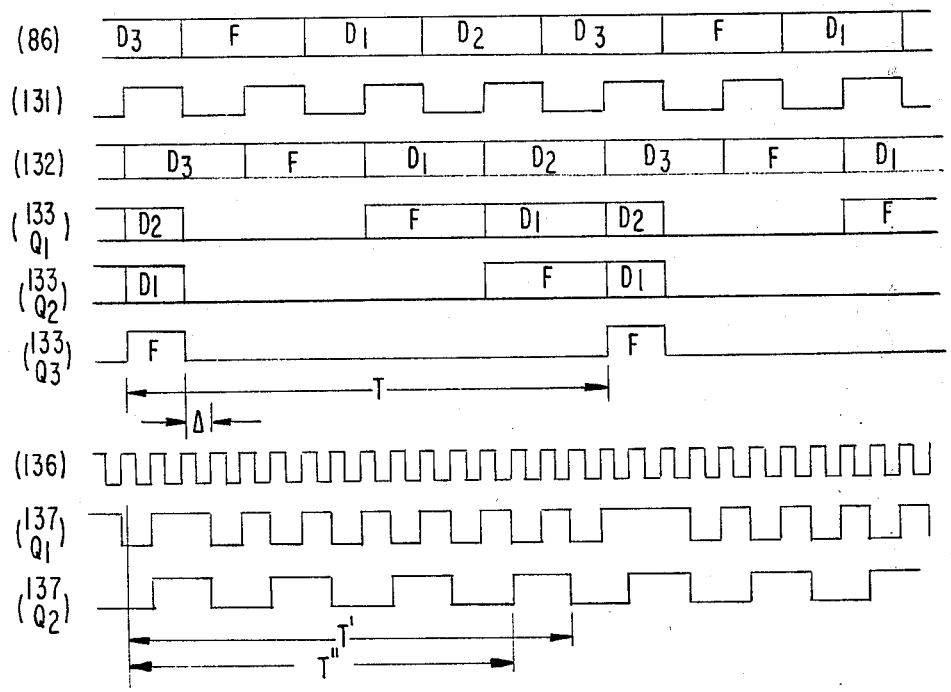
FIG. 27 shows several signals for use in describing operation of the circuit illustrated in FIG. 26.

Referring to FIG. 26 and a greater part of FIG. 27, a clock generator is shown which is used for generating local clocks with the bit rate of the binary bits supplied to the signal input terminal 86 in cooperation with a synchronizing bit extractor 83'. The synchronizing bit extractor 83' for extracts the burst synchronizing bits F from the binary receive signals supplied to the signal input terminal 86 by the use of reference clocks supplied to a clock input terminal 131 from the master terminal 32 (FIG. 3), either superposed on the digital receiver signal bursts or through a separate channel. It is known in the art to regenerate the master clocks from the binary receive signals by the use of a tank circuit as described in the above-referenced Mayet et al article in connection with FIG. 8 thereof. Such a tank circuit or clock extractor may be connected at the clock input terminal 131. Alternatively, the reference clocks may be the recovered clocks recovered by the clock regenerator illustrated with reference to FIG. 25. As will soon become clear, the clock generator is operable entirely on a digital basis and can be implemented with semiconductor integrated circuits. Merely for simplicity of illustration, it will be assumed for the time being that the signals supplied to the signal input terminal 86 have a format depicted in FIG. 27 at (86). More specifically, it is assumed the signals have a few consecutive frames, each consisting of a burst synchronizing bit F followed by three binary information bits $D_1$, $D_2$, and $D_3$.

The synchronizing bit extractor 83' may comprise an input flip-flop 132 having a data input terminal D supplied with the binary bits from the signal input terminal 86, a clock input terminal CP supplied with the reference clocks shown at (131), and an output terminal Q for producing successively latched bits of the binary bits supplied to the data input terminal D. The latched bits are depicted at (132) and have the format of the binary bits supplied to the signal input terminal 86. A three-stage shift register 133 has first through third shift register stages $Q_1$, $Q_2$, and $Q_3$ into which the latched bits supplied to its data input terminal IN are successively shifted by the reference clocks supplied to a clock input terminal CP until cleared by a clear signal supplied to a clear input terminal CL as will shortly be described. The shift register 133 has an output terminal for producing the binary bits successively shifted to the third stage $Q_3$ as a shift register output signal. A clear flip-flop 134 of the edge trigger type has a data input terminal D successively supplied with the third stage output bits, a clock input terminal CP supplied with the reference clocks through an inverter 135, and an output terminal Q for successively producing the binary bits of the third stage output signal latched by the trailing edges of the reference clocks. The latched third stage output bits are used as the clear signal. Inasmuch as all the burst synchronizing bits F are at the logic "1" level, the binary bits successively shifted to the stages $Q_1$ through $Q_3$ become as depicted at ($133Q_1$), ($133Q_2$), and ($133Q_3$) in a stationary state. The output signal of the shift register 133 therefore becomes the burst synchronizing bits F extracted with a half bit width. It is possible to use the shift register output signal as the extracted burst synchronizing bits.

The clock generator of FIG. 26 further comprises a local clock generator 136 for generating local clocks with a local clock frequency $f_L$ as shown at (136). As compared with the reference clock frequency $f_O$ of the reference clocks, the local clock frequency is in a higher frequency range as will shortly be discussed in more detail. For the time being, it is assumed that the local clock frequency is about four times the reference clock frequency. A counter 137 has first and second counter stages $Q_1$ and $Q_2$ for counting the local clocks supplied to a clock input terminal CP. During the progress of the count, the first and the second stages $Q_1$ and $Q_2$ are repeatedly loaded with a logic "1" signal supplied to first and second stage input terminals $D_1$ and $D_2$ from a power source $V_{cc}$ through a resistor by cooperation of the local clocks and the shift register output signal supplied to a load input terminal LD. More specifically, the logic "1" is concurrently set in the stages $Q_1$ and $Q_2$ as depicted at ($137Q_1$) and ($137Q_2$) each time the local clock rises during presence of the extracted burst synchronizing bit. The count proceeds in cycles after the fall of the shift register output signal to logic "0" until the appearance of a next subsequently extracted burst synchronizing bit. After the fall of all extracted burst synchronizing bits, the first counter stage $Q_1$ is rendered logic "0" when a local clock falls for the first time.

The second counter stage $Q_2$ supplies generated clocks to a clock output terminal 138. During each cycle of generation, the generated clocks rise when a local clock rises next following each rising edge of the extracted burst synchronizing bit and at every fourth rising edge of the local clocks. The phase difference of the generated clocks relative to the reference clocks therefore accumulates during each cycle. It is nevertheless possible to latch the binary receive signals at the rising edges of the generated clocks without any omission or slip if the phase difference is kept small by the repeated loading of the logic "1" signal to render the number of generated clocks in each cycle equal to the number of reference clocks.

More generally, it is now assumed that the counter 137 frequency divides the local clocks by a ratio M. The number of reference clocks in each frame period T and clock pulse widths of the reference and the local clocks will be denoted by N, $t_O$, and $t_L$. The frame period is equal to $Nt_O$. The generated clocks have a clock pulse width equal to $Mt_L$. It is assumed that a first generated clock falls a delay $\Delta$ after the falling edge of each extracted burst synchronizing bit of a half reference clock pulse width $t_O/2$. The fall of an N-th generated clock takes place an interval of time T' after the rising edge of each extracted burst synchronizing bit, which interval is equal to $[t_O/2+\Delta+(N-1)Mt_L]$. In order for the generated clocks to fall N times per frame period, the interval T' should be longer than $(Nt_O - Mt_L)$ and shorter than $Nt_O$. With the delay $\Delta$ is represented by $\gamma t_L$, where the factor $\gamma$ is greater than zero and less than unity, the local clock frequency, namely, the reciprocal of the local clock pulse width $t_L$, should be higher than $f_O[M(N-1)+\gamma]/[N-\frac{1}{2}]$ and lower than $f_O[MN+\gamma]/[N-\frac{1}{2}]$. In view of the restriction on the factor $\gamma$, a first set of inequalities is obtained:

$$f_O[M(N-1)+1]/[N-\frac{1}{2}] < f_L < f_O MN/[N-\frac{1}{2}].$$

On the other hand, assume now that the first generated clock latches a first binary bit of the receive signal. In the example under discussion, the first binary bit is a $D_3$ bit. An i-th generated clock rises an interval of time T'' after the rise of each extracted burst synchronizing bit, which interval is equal to $[t_O/2+\Delta-Mt_L/2+(i-1)Mt_L]$. In order than the i-th generated clock should correctly latch an i-th binary bit, the interval T'' should be longer than $(i-3/2)t_O$ and shorter than $(i-\frac{1}{2})t_O$. In FIG. 27, the interval T'' is depicted for a fourth generated clock. Inasmuch as the accumulation of phase difference would give rise to problems when the index i is greater than two, a second set of inequalities is obtained, as is the case with the first set of inequalities, as:

$$f_O[M(i-3/2)+1]/[i-1] < f_L < f_O M[i-1]/[i-2].$$

By way of example, let it be assumed that the reference clock frequency $f_O$, the number N of bits in each frame period, and the frequency division ratio M are 256 kHz, thirty-two, and eight, respectively. It is then seen that the local clock frequency $f_L$ should be higher than 2.023... MHz and lower than 2.080... MHz from the first set of inequalities and higher than 2.023... MHz and lower than 2.082 MHz from the second set of inequalities. Allowing for possible frequency fluctuations, the local clock frequency may be selected in a frequency range between 2.024 MHz and 2.080 MHz.

Figure 28:
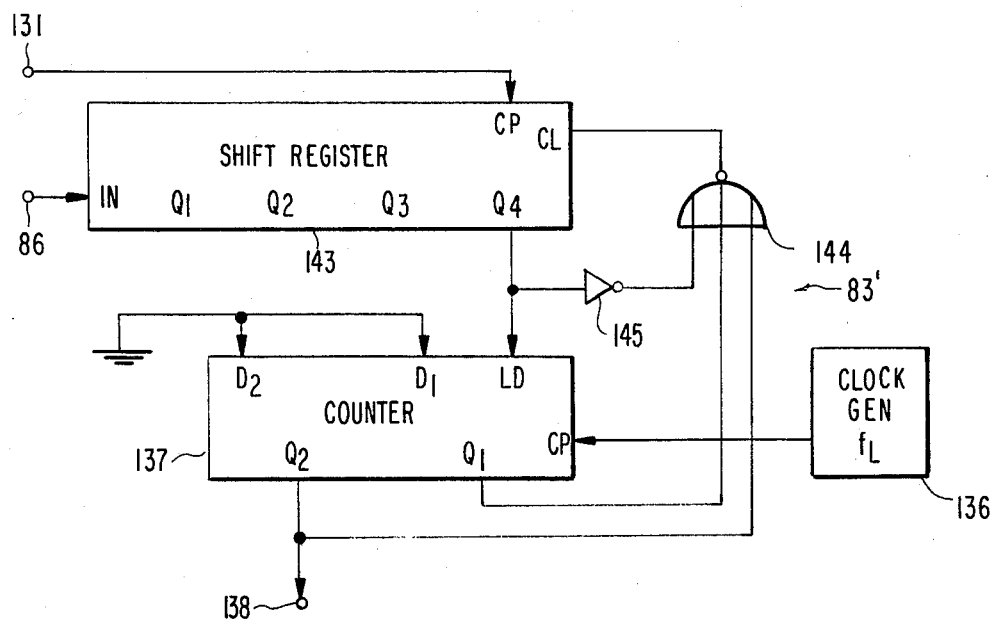
FIG. 28 is a block diagram of another synchronizing bit extractor and another clock generator for use in the subscriber terminal shown in any one of FIGS. 3, 5, 11, and 14.

Finally referring to FIGS. 28 and 29, another clock generator comprises similar parts designated by like reference numerals and is operable again in cooperation with a synchronizing bit extractor 83' of the type described with reference to FIGS. 26 and 27. In the example here illustrated, the synchronizing bit extractor 83' comprises a four-stage shift register 143 rather than the three-stage shift register 133 accompanied by the input flip-flop 132. The four-stage shift register 143 has first through fourth shift register stages $Q_1$, $Q_2$, $Q_3$, and $Q_4$. A three-input NOR gate 144 is substituted for the clear flip-flop 134. Repeatedly cleared by a clear signal supplied from the NOR gate 144 as will presently be described, the shift register 144 produces a shift register output signal in accordance with the binary bits successively shifted into the fourth stage $Q_4$. The first and the second stage input terminals $D_1$ and $D_2$ of the counter 137 are supplied with a logic "0" signal from ground. The counter 137 produces first and second counter output signals from the first and the second counter stages $Q_1$ and $Q_2$. The NOR gate 144 is supplied with the first and the second counter output signals directly and the shift register output signal through an inverter 145.

Figure 29:
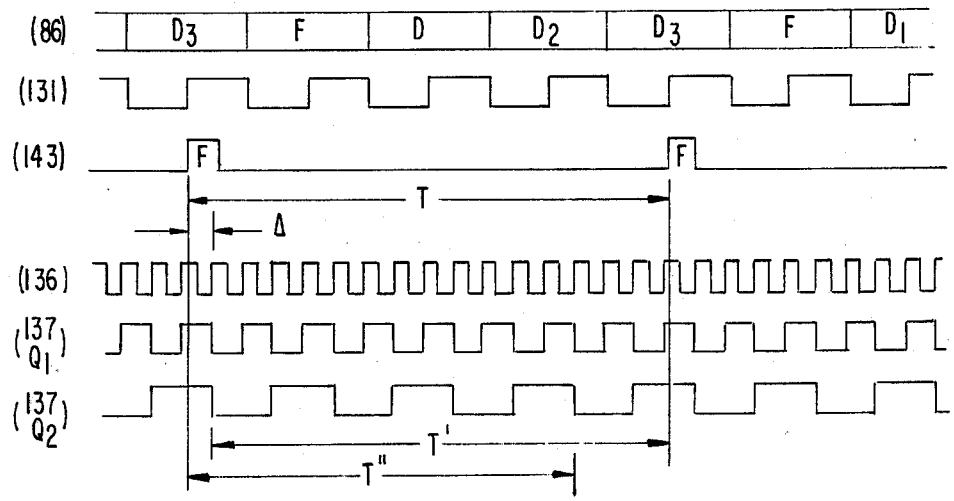
FIG. 29 shows several signals for use in describing operation of the circuit illustrated in FIG. 28.

As depicted in FIG. 29 at (143), the shift register output signal provides extracted burst synchronizing bits F with a quarter bit width. When a local clock rises for the first time while an extracted burst synchronizing bit is at the logic "1" level, the logic "0" signal is loaded in the first and the second counter stages $Q_1$ and $Q_2$. The first counter stage $Q_1$ is set to the logic "1" level when a local clock rises next following the falling edge of each extracted burst synchronizing bit. In other respects, operation of the synchronizing bit extractor 83' and the clock generator is similar to that described with reference to FIGS. 26 and 27.

Let is now be presumed that a first generated clock falls and next preceding the falling edge of an extracted burst synchronizing bit a delay $\Delta$ after the rise of the extracted synchronizing bit under consideration. In other words, an interval of time T' between an instant at which the counter stages $Q_1$ and $Q_2$ are loaded with the logic "0" signal and another rising edge of a next subsequently extracted burst synchronizing bit is equal to $Nt_O - \Delta$. In order for N generated clocks to be produced in the meanwhile, the interval T' should be longer than $M(N-\frac{1}{2})t_L$ and shorter than $M(N+\frac{1}{2})t_L$. A first set of inequalities is:

$$f_O[M(N-\tfrac{1}{2})+1]/N < f_L < f_O M[N+\tfrac{1}{2}]/N.$$

On the other hand, latch of the binary bits should be carried out at instants of build down of the generated clocks. An i-th generated clock builds down an interval of time T" after build up of each extracted burst synchronizing bit, which interval is equal to $M(i-1)t_L - \Delta$. In FIG. 29, the interval T" is shown for a fourth generated clock. In order that the i-th generated clock would correctly latch an i-th binary bit, the interval T" should be longer than $(i-3/2)t_O$ and shorter than $(i-\tfrac{1}{2})t_O$. A second set of inequalities is obtained as follows:

$$f_O[M(i-1)+1]/[i-\tfrac{1}{2}] < f_L < f_O M[i-1]/[i-3/2].$$

The frequency range from which the local clock frequency $f_L$ should be selected, may be between 2.024 MHz and 2.080 MHz.

While preferred embodiments of this invention and several modifications thereof have thus far been described, it is readily possible for those skilled in the art to put this invention into effect in various other manners. For example, the master clocks received at the subscriber terminal 31 may be used in the circuitry described with reference to FIGS. 3, 5, 11, 14, 18, 22, and 24 instead of the recovered clocks. The binary bits among which the one-clock delayed receive signals are interspersed may be used in the circuitry illustrated with reference to FIGS. 18, 22, 24, 26, and 28. The generated clocks may be used in the timer 69 (FIG. 3) and supplied to the counter 81 (FIGS. 5, 11, 14, 22, and 24) and the decoder 42 and encoder 47 (FIG. 1). The receive and send signals need not necessarily be binary but digital in general. As can be understood from the description relating to FIGS. 23 and 29, various signals may have their "active" state at the logic "0" level. The duty cycle need not be 50 percent. It is possible to use the synchronizing bit extractor 83' (FIG. 26 or 28) as the synchronizing bit extractor 83 described in connection with any one of FIGS. 6, 7, 22, and 24.

What is claimed is:

1. A subscriber terminal for use in a bidirectional communication network in which said subscriber terminal is connected to a master terminal through a communication channel and in which said subscriber terminal receives a receive signal composed of a plurality of digital receive signal bursts from said master terminal through said channel and sends a digital send signal burst to said master terminal through said channel on a time shared basis in each frame period to carry out communication with said master terminal in a communication interval following a call originating interval, said subscriber terminal comprising first means capable of being put once in each frame period in a first mode of producing digital receive signals with a first frame phase in response to the receive signal bursts received through said channel, second means capable of being put once in each frame period in a second mode of supplying digital send signals with a second frame phase to said channel as the send signal bursts, third means responsive to said receive signals for putting said first and said second means in said first mode and out of said second mode, respectively, and then out of said first mode and in said second mode, respectively, in each frame period to synchronize said second frame phase with said first frame phase, means responsive to said receive and said send signals for carrying out said communication, and means for producing a call originating signal in said call originating interval, wherein the improvement comprises means responsive to said call originating signal for activating said third means to cause said third means to put said first and said second means temporarily out of said first mode and in said second mode, respectively, and then in said first mode and out of said second mode respectively, repeatedly until said call originating interval is followed by said communication interval, said second means supplying said call originating signal to said channel while being temporarily put in said second mode, said first means producing, while being continuously put in said first mode after being temporarily put out of said first mode, a digital receive signal with said first frame phase in response to each digital receive signal burst supplied to said channel by said master terminal in response to the call originating signal arriving thereat through said channel.

2. A subscriber terminal as claimed in claim 1, the improvement further comprising each receive signal burst having a predetermined burst length shorter than a half of said frame period and comprising a burst synchronizing bit and a predetermined number of information bits, each receive signal comprising the synchronizing and the information bits at a predetermined bit rate and with a receive bit phase dependent on a predetermined bit phase, and wherein said third means comprises:

clock producing means for producing local clocks at said predetermined bit rate and with said receive bit phase;

means for extracting the synchronizing bits from the respective receive signals to produce a sequence of extracted synchronizing bits with said first frame phase;

resettable counting means repeatedly reset by said extracted synchronizing bits to a predetermined count representative of a local frame phase for counting said clocks from said predetermined count to successive counts representative of successive phases relative to said local frame phase to produce a first, a second, and a third timing signal representative of a first, a second, and a third preselected phase relative to said local frame phase, respectively, each of said first and said second timing signals having a duration substantially equal to said burst length;

synchronism monitoring means responsive to said third timing signal and each receive signal for monitoring the synchronism of said local frame phase with said first frame phase for producing in response thereto an out of synchronism signal only when said local frame phase is out of synchronism with said first frame phase;

fourth means connected to said resettable counting means and said synchronism monitoring means for putting said first means in said first mode only during presence of said first timing signal while said out of synchronism signal is absent and irrespective of states of said first through said third timing signals while said out of synchronism signal is present; and fifth means connected to said resettable counting means and said synchronism monitoring means for putting said second means in said second mode only during presence of said second timing signal while said out of synchronism signal is absent and out of said second mode irrespective of states of said first through said third timing signals while said out of synchronism signal is present.

3. A subscriber terminal as claimed in claim 2, wherein said synchronism monitoring means comprises a flip-flop responsive to said third timing signal and each receive signal for latching the synchronizing bit of said each receive signal only when said third preselected phase is in synchronism with said first frame phase for producing in response thereto said out of synchronism signal only when the last-mentioned synchronizing bit is not latched.

4. A subscriber terminal as claimed in claim 3, wherein:

said resettable counting means produces a first and a second counting means output signal, said first counting means output signal being a logic "0" for representing an active state of said first timing signal, said second counting means output signal being a logic "1" for representing an active state of said second timing signal;

said synchronism monitoring means producing a monitoring means output signal being a logic "0" for representing an active state of said out of synchronism signal;

said fourth means comprising:

a two-input AND gate supplied with said first counting means output signal and said monitoring means output signal for producing in response thereto a first output signal; and means for supplying said first output signal to said first means, said first means being put in and out of said first mode when said first output signal is at logic "0" and logic "1" levels, respectively;

said fifth means comprising:

a two-input AND gate supplied with said second counting means output signal and said monitoring means output signal for producing in response thereto a second output signal; and means for supplying said second output signal to said second means, said second means being put in and out of said second mode when said second output signal is at logic "1" and the logic "0" levels, respectively.

5. A subscriber terminal as claimed in claim 2, wherein said synchronism monitoring means comprises:

means responsive to said third timing signal and each receive signal for producing a trigger signal only when said third preselected phase is out of synchronism with said first frame phase; and a monostable multivibrator responsive to said trigger signal for producing said out of synchronism signal during an interval of time equal to a product of said frame period and a predetermined natural number after said trigger signal is produced.

6. A subscriber terminal as claimed in claim 5, wherein:

said resettable counting means produces a first and a second counting means output signal, said first counting means output signal being a logic "0" for representing an active state of said first timing signal, said second counting means output signal being a logic "1" for representing an active state of said second timing signal;

said monostable multivibrator producing a monostable multivibrator output signal being a logic "0" for representing an active state of said out of synchronism signal;

said fourth means comprising:

a two-input AND gate supplied with said first counting means output signal and said monostable multivibrator output signal for producing in response thereto a first output signal; and means for supplying said first output signal to said first means, said first means being put in and out of said first mode when said first output signal is at logic "0" and logic "1" levels, respectively;

said fifth means comprising:

a two-input AND gate supplied with said second counting means output signal and said monostable multivibrator output signal for producing in response thereto a second output signal; and means for supplying said second output signal to said second means, said second means being put in and out of said second mode when said second output signal is at logic "1" and logic "0" levels, respectively.

7. A subscriber terminal as claimed in claim 2, wherein, for a case in which the synchronizing bit of each receive signal is at a logic "1" level:

said resettable counting means produces a first, a second, and a third counting means output signal, said first counting means output signal being a logic "0" for representing an active state of said first timing signal, said second counting means output signal being a logic "1" for representing an active state of said second timing signal, said third timing means output signal being a logic "1" for representing an active state of said third timing signal;

said synchronism monitoring means comprising:

a first flip-flop having a data, a clock, and a preset input terminal for latching the synchronizing bit of each receive signal supplied to said data input terminal by the third counting means output signal supplied to said clock input terminal for thereby producing a first flip-flop output signal at logic "1" and logic "0" levels when said third preselected phase is in and out of synchronism with said first frame phase, respectively, said first flip-flop being preset by a preset input signal supplied to said preset input terminal during out of synchronism of said third preselected phase with said first frame phase thereby setting said first flip-flop output signal to a logic "1" level;

a second flip-flop having a data, a clock, and a clear input terminal, said second flip-flop being cleared for producing a second flip-flop output signal at a logic "0" level when the first flip-flop output signal supplied to said clear input terminal is at a logic "0" level, said second flip-flop latching a logic "1" signal continuously supplied to said data input terminal for changing said second flip-flop output signal to a logic "1" level when the third counting means output signal supplied to said clock input terminal changes from a logic "1" level to a logic "0" level; and means for supplying the second flip-flop output signal at a logic "0" level to said preset input terminal as said preset input signal;

said fourth means comprising:

a single flip-flop having a data, a clock, and a clear input terminal, said single flip-flop being cleared to produce a single flip-flop output signal at a logic "0" level when the second flip-flop output signal supplied to said clear input terminal changes from a logic "1" level to a logic "0" level, said single flip-flop latching a logic "1" signal continuously supplied to said data input terminal for changing said single flip-flop output signal from a logic "0" level to a logic "1" level when the first counting means output signal supplied to said clock input terminal changes from a logic "0" level to a logic "1" level;

a two-input AND gate supplied with said first counting means output signal and said single flip-flop output signal for producing in response thereto a first output signal; and means for supplying said first output signal to said first means, said first means being put in and out of said first mode when said first output signal is at logic "0" and logic "1" levels, respectively;

said fifth means comprising:

a two-input AND gate supplied with said second counting means output signal and said second flip-flop output signal for producing in response thereto a second output signal; and means for supplying said second output signal to said second means, said second means being put in and out of said second mode when said second output signal is at logic "1" and logic "0" levels, respectively.

8. A subscriber terminal as claimed in claim 1, the improvement further comprising each signal burst having a predetermined burst length shorter than a half of said frame period and comprising a burst synchronizing bit and a predetermined number of information bits, each receive signal comprising the synchronizing and the information bits at a predetermined bit rate and with a receive bit phase dependent on a predetermined bit phase, and wherein said third means comprises:

clock producing means for producing local clocks at said predetermined bit rate and with said receive bit phase;

means responsive to said clocks and each receive signal for producing an extracted synchronizing bit and a delayed synchronizing bit concurrently with appearance of the synchronizing bit in said each receive signal and one clock thereafter, respectively;

resettable counting means repeatedly reset by the extracted synchronizing bits to a predetermined count representative of a local frame phase for counting said clocks from said predetermined count to successive counts representative of successive phases relative to said local frame phase to produce a first, a second, and a third timing signal representative of a first, a second, and a third preselected phase relative to said local frame phase, respectively, each of said first and said second timing signals having a duration substantially equal to said burst length;

synchronism monitoring means responsive to said third timing signal and said delayed synchronizing bit for monitoring the synchronism of said local frame phase with said first frame phase for producing in response thereto an out of synchronism signal only when said local frame phase is out of synchronism with said first frame phase;

fourth means connected to said resettable counting means and said synchronism monitoring means for putting said first means in said first mode only during presence of said first timing signal while said out of synchronism signal is absent and irrespective of states of said first through said third timing signals while said out of synchronism signal is present; and fifth means connected to said resettable counting means and said synchronism monitoring means for putting said second means in said second mode only during presence of said second timing signal while said out of synchronism signal is absent and out of said second mode irrespective of states of said first through said third timing signals while said out of synchronism signal is present.

9. A subscriber terminal as claimed in claim 8, wherein said synchronism monitoring means comprises a flip-flop responsive to said third timing signal and said delayed synchronizing bit for latching said delayed synchronizing bit only when said third preselected phase is in synchronism with said first frame phase for producing in response thereto said out of synchronism signal only when said delayed synchronizing bit is not latched.

10. A subscriber terminal as claimed in claim 9, wherein:

said resettable counting means produces a first and a second counting means output signal, said first counting means output signal being a logic "0" for representing an active state of said first timing signal, said second counting means output signal being a logic "1" for representing an active state of said second timing signal;

said synchronism monitoring means producing a monitoring means output signal being a logic "0" for representing an active state of said out of synchronism signal;

said fourth means comprising:

a two-input AND gate supplied with said first counting means output signal and said monitoring means output signal for producing in response thereto a first output signal; and means for supplying said first output signal to said first means, said first means being put in and out of said first mode when said first output signal is at logic "0" and logic "1" levels, respectively;

said fifth means comprising:

a two-input AND gate supplied with said second counting means output signal and said monitoring means output signal for producing in response thereto a second output signal; and means for supplying said second output signal to said second means, said second means being put in and out of said second mode when said second output signal is at logic "1" and logic "0" levels, respectively.

11. A subscriber terminal as claimed in claim 8, wherein said synchronism monitoring means comprises:
   means responsive to said third timing signal and each receive signal for producing a trigger signal only when said third preselected phase is out of synchronism with said first frame phase; and
   a monostable multivibrator responsive to said trigger signal for producing said out of synchronism signal during an interval of time equal to a product of said frame period and a predetermined natural number after said trigger signal is produced.

12. A subscriber terminal as claimed in claim 11, wherein:
   said resettable counting means produces a first and a second counting means output signal, said first counting means output signal being a logic "0" for representing an active state of said first timing signal, said second counting means output signal being a logic "1" for representing an active state of said second timing signal;
   said monostable multivibrator producing a monostable multivibrator output signal being a logic "0" for representing an active state of said out of synchronism signal;
   said fourth means comprising:
   a two-input AND gate supplied with said first counting means output signal and said monostable multivibrator output signal to produce a first output signal; and
   means for supplying said first output signal to said first means, said first means being put in and out of said first mode when said first output signal is at logic "0" and logic "1" levels, respectively;
   said fifth means comprising:
   a two-input AND gate supplied with said second counting means output signal and said monostable multivibrator output signal for producing in response thereto a second output signal; and
   means for supplying said second output signal to said second means, said second means being put in and out of said second mode when said second output signal is at logic "1" and logic "0" levels, respectively.

13. A subscriber terminal as claimed in claim 8, wherein, for a case in which said delayed synchronizing bit is at a logic "1" level:
   said resettable counting means produces a first, a second, and a third counting means output signal, said first counting means output signal being a logic "0" for representing an active state of said first timing signal, said second counting means output signal being a logic "1" for representing an active state of said second timing signal, said third timing means output signal being a logic "1" for representing an active state of said third timing signal and otherwise, respectively;
   said synchronism monitoring means comprising:
   a first flip-flop having a data, a clock, and a preset input terminal for latching the delayed synchronizing bit supplied to said data input terminal by the third counting means output signal supplied to said clock input terminal for producing in response thereto a first flip-flop output signal at logic "1" and logic "0" levels when said third preselected phase is in and out of synchronism with said first frame phase, respectively, said first flip-flop being preset by a preset input signal supplied to said preset input terminal during out of synchronism of said third preselected phase with said first frame phase thereby setting said first flip-flop output signal to a logic "1" level;
   a second flip-flop having a data, a clock, and a clear input terminal, said second flip-flop being cleared for producing a second flip-flop output signal at a logic "0" level when the first flip-flop output signal supplied to said clear input terminal is at a logic "0" level, said second flip-flop latching a logic "1" signal continuously supplied to said data input terminal for changing said second flip-flop output signal to a logic "1" level when the third counting means output signal supplied to said clock input terminal changes from a logic "1" level to a logic "0" level; and
   means for supplying the second flip-flop output signal at a logic "0" level to said preset input terminal as said preset input signal;
   said fourth means comprising:
   a single flip-flop having a data, a clock, and a clear input terminal, said single flip-flop being cleared to produce a single flip-flop output signal at a logic "0" level when the second flip-flop output signal supplied to said clear input terminal changes from a logic "1" level to a logic "0" level, said single flip-flop latching a logic "1" signal continuously supplied to said data input terminal for changing said single flip-flop output signal from a logic "0" level to a logic "1" level when the first counting means output signal supplied to said clock input terminal changes from a logic "0" level to a logic "1" level;
   a two-input AND gate supplied with said first counting means output signal and said single flip-flop output signal for producing in response thereto a first output signal; and
   means for supplying said first output signal to said first means, said first means being put in and out of said first mode when said first output signal is at logic "0" and logic "1" levels, respectively;
   said fifth means comprising:
   a two-input AND gate supplied with said second counting means output signal and said second flip-flop output signal for producing in response thereto a second output signal; and
   means for supplying said second output signal to said second means, said second means being put in and out of said second mode when said second output signal is at logic "1" and the logic "0" levels, respectively.

14. A subscriber terminal as claimed in claim 1, wherein the improvement further comprises each signal burst having a predetermined burst length shorter than a half of said frame period and comprising a burst synchronizing bit and a predetermined number of information bits, each receive signal comprising the synchronizing bit with a logic "1" level and the information bits at a predetermined bit rate and with a receive bit phase dependent on a predetermined bit phase, and wherein said third means comprises:
   clock producing means for producing local clocks at said predetermined bit rate and with said receive bit phase;
   resettable counting means repeatedly reset by a sequence of reset signals to a predetermined count representative of a local frame phase for counting said clocks from said predetermined count to successive counts representative of successive phases relative to said local frame phase to produce a first, a second, and an additional timing signal, each of said first, said second, and said additional timing signals being variable between a logic "1" level and a logic "0" level, said first timing signal changing from the logic "1" level to the logic "0" level and said second timing signal changing from the logic "0" level to the logic "1" level to indicate a first and a second preselected phase, respectively, relative to said local frame phase, each of the first timing signal of the logic "0" level and the second timing signal of the logic "1" level having a duration substantially equal to said burst length, said additional timing signal temporarily being a logic "1" level while said first timing signal is a logic "1" level;

a two-input OR gate supplied with an OR gate input signal and said receive signals for producing in response thereto an OR gate output signal;

a flip-flop having a data, a clock, and a clear input terminal supplied with said OR gate output signal, said clocks, and said additional timing signal, respectively, for producing in response thereto a true and an inverse output signal;

means for supplying said true output signal to said OR gate as said OR gate input signal;

a NAND gate supplied with said OR gate output signal and said inverse output signal to produce a NAND gate output signal;

means for supplying said NAND gate output signal to said resettable counting means as each reset signal to synchronize said local frame phase to said first frame phase; and means for supplying said first and said second timing signals to said first and said second means, said first means being put in and out of said first mode when said first timing signal is at logic "0" and the logic "1" levels, respectively, said second means being put in and out of said second mode when said second timing signal is at logic "1" and logic "0" levels, respectively.

15. A subscriber terminal as claimed in claim 1, each signal burst having a predetermined burst length shorter than a half of said frame period and comprising a burst synchronizing bit and a predetermined number of information bits, each receive signal comprising the synchronizing bit with a logic "1" level and the information bits at a predetermined bit rate and with a receive bit phase dependent on a predetermined bit phase, wherein said third means comprises:

clock producing means for producing local clocks at said predetermined bit rate and with said receive bit phase;

resettable counting means repeatedly reset by a sequence of reset signals to a predetermined count representative of a local frame phase for counting said clocks from said predetermined count to successive counts representative of successive phases relative to said local frame phase to produce a first, a second, and an additional timing signal, each of said first, said second, and said additional timing signals being variable between the logic "1" level and a logic "0" level, said first timing signal turning from the logic "1" level to the logic "0" level and said second timing signal turning from the logic "0" to the logic "1" level to indicate a first and a second preselected phase relative to said local frame phase, respectively, each of the first timing signal of the logic "0" level and the second timing signal of the logic "1" level having a duration substantially equal to said burst length, said additional timing signal temporarily having the logic "1" level while said first timing signal has the logic "1" level;

a two-input OR gate supplied with an OR gate input signal and said receive signals for producing in response thereto an OR gate output signal;

a first two-input NAND gate supplied with a NAND gate input signal and said additional timing signal for producing in response thereto a first NAND gate output signal;

a flip-flop having a data, a clock, and a clear input terminal supplied with said OR gate output signal, said clocks, and said first NAND gate output signal, respectively, to produce a true and an inverse output signal;

means for supplying said true output signal to said OR gate an said first NAND gate as said OR gate input signal and said NAND gate input signal, respectively;

a second two-input NAND gate supplied with said OR gate output signal and said inverse output signal for producing in response thereto a second NAND gate output signal;

means for supplying said second NAND gate output signal to said resettable counting means as each reset signal to synchronize said local frame phase to said first frame phase; and means for supplying said first and said second timing signals to said first and said second means, said first means being put in and out of said first mode when said first timing signal is at logic "0" and the logic "1" levels, respectively, said second means being put in and out of said second mode when said second timing signal is at the logic "1" and the logic "0" levels, respectively.

16. A subscriber terminal as claimed in any one of claims 2 through 14 or 15, wherein said clock producing means comprises means responsive to said receive signals for producing said local clocks.

17. A subscriber terminal as claimed in any one of claims 2 through 14 or 15, wherein said clock producing means comprises:

a local clock generator for generating higher rate clocks at a rate higher than said predetermined bit rate;

a resettable counter for counting said higher rate clocks for producing in response thereto generated clocks substantially at said predetermined bit rate and with a local clock phase; and means for resetting said resettable counter to a preselected count by the higher rate clock generated for the first time after each extracted synchronizing bit is produced, thereby to synchronize said local clock phase to said receive bit phase.

* * * * *

UNITED STATES PATENT AND TRADEMARK OFFICE
CERTIFICATE OF CORRECTION

PATENT NO. : 4,404,672

DATED : Sepember 13, 1983

INVENTOR(S) : Hiroshi SHIMIZU

Page 1 of 3

It is certified that error appears in the above-identified patent and that said Letters Patent is hereby corrected as shown below:

Column 1, line 8, after "set" insert --namely--

Column 8, line 31, after "timer" change "68" to --69--

Column 8, line 51, after "receiver" change "37" to --36--

Column 9, line 2, after "and" delete the "-"

Column 9, line 34, before "removes" delete "and"

Column 14, line 57, after "enable" delete "set to" and insert --signal--

Column 14, line 58, before "the" (first occurrence) delete "given" and insert --set to--

Column 14, line 59, after "mode" delete "respectively"

Column 14, line 60, after "mode" and before "." insert --, respectively--

Column 15, line 22, change "synchronised" to --synchronized--

Column 5, line 28, after "bursts" delete ", respectively,

Column 5, line 29, after "bursts" insert --, respectively,--

UNITED STATES PATENT AND TRADEMARK OFFICE
CERTIFICATE OF CORRECTION

PATENT NO. : 4,404,672

DATED : September 13, 1983

INVENTOR(S) : Hiroshi SHIMIZU

It is certified that error appears in the above-identified patent and that said Letters Patent is hereby corrected as shown below:

Column 15, line 31, after "a" change "prdeter" to --predeter--

Column 15, line 52, before "rises" delete "builds up"

Column 15, line 54, after "depending" insert --,--

Column 18, line 43, after "1" insert --by--

Column 19, line 4, "sunchronism" should be --synchronism--

Column 19, line 14, after "respectively" insert --,--

Column 21, line 4, after "assumed" insert --that--

Column 21, line 20, after "nal." insert --in the logic "o" state--

UNITED STATES PATENT AND TRADEMARK OFFICE
CERTIFICATE OF CORRECTION

PATENT NO. : 4,404,672

DATED : September 13, 1983

INVENTOR(S) : Hiroshi SHIMIZU

It is certified that error appears in the above-identified patent and that said Letters Patent is hereby corrected as shown below:

```
Column 21, line 20, after "rises" insert --;-- and delete
"in the"
Column 21, line 21, delete "o" state;"
Column 22, line 3 change "of" to --on--
Column 22, line 26, delete "for"
Column 22, line 30, change "receiver" to --receive--
Column 22, line 34, change "mayet" to --mayer--
Column 23, line 20, after "range" insert --,--
```

Signed and Sealed this

Nineteenth Day of February 1985

[SEAL]

Attest:

DONALD J. QUIGG

Attesting Officer

Acting Commissioner of Patents and Trademarks